(12) United States Patent
Klein et al.

(10) Patent No.: US 10,765,064 B2
(45) Date of Patent: Sep. 8, 2020

(54) VERTICAL HYDROPONIC TOWER HARVESTING SYSTEM

(71) Applicant: MJNN, LLC, South San Francisco, CA (US)

(72) Inventors: Brice Klein, San Francisco, CA (US); John Whitworth, Mountain View, CA (US); Loren Pilorin, Palo Alto, CA (US); Anna Olson, San Mateo, CA (US); Maria Malone, San Francisco, CA (US); Alexandre Le Roux, Menlo Park, CA (US); Michael Flynn, Palo Alto, CA (US); Tamara Hasoon, Redwood City, CA (US)

(73) Assignee: MJNN, LLC, South San Francisco, CA (US)

( * ) Notice: Subject to any disclaimer, the term of this patent is extended or adjusted under 35 U.S.C. 154(b) by 308 days.

(21) Appl. No.: 16/012,932

(22) Filed: Jun. 20, 2018

(65) Prior Publication Data

US 2019/0387677 A1 Dec. 26, 2019

(51) Int. Cl.
| | |
|---|---|
| *A01D 46/20* | (2006.01) |
| *A01D 46/24* | (2006.01) |
| *A01D 34/835* | (2006.01) |
| *A01G 31/06* | (2006.01) |
| *A01D 57/01* | (2006.01) |
| *A01D 43/00* | (2006.01) |
| *A01D 43/063* | (2006.01) |

(52) U.S. Cl.
CPC .......... *A01D 46/20* (2013.01); *A01D 34/835* (2013.01); *A01D 43/00* (2013.01); *A01D 43/063* (2013.01); *A01D 46/24* (2013.01); *A01D 57/01* (2013.01); *A01G 31/06* (2013.01)

(58) Field of Classification Search
CPC ........ A01D 46/20; A01D 46/24; A01D 93/00; A01D 34/835; A01G 31/06
See application file for complete search history.

(56) References Cited

U.S. PATENT DOCUMENTS

| | | | | |
|---|---|---|---|---|
| 3,127,725 A | * | 4/1964 | Richardson | A01D 46/24 56/328.1 |
| 3,552,106 A | * | 1/1971 | Baxter | A01D 46/24 56/328.1 |
| 3,612,221 A | * | 10/1971 | Branham | B66F 9/08 187/222 |
| 3,810,351 A | * | 5/1974 | Austin | A01D 46/24 56/328.1 |
| 4,593,883 A | * | 6/1986 | Nelson | B66F 9/02 254/100 |

(Continued)

*Primary Examiner* — Alicia Torres
(74) *Attorney, Agent, or Firm* — Patent Law Office of David G. Beck

(57) ABSTRACT

A plant harvesting system for use with a vertical hydroponic tower, the hydroponic tower containing a plurality of vertically aligned plants. The harvesting system includes a payload transport system and a harvester. The payload transport system, which is configured to be positioned at a location adjacent to the hydroponic tower, includes a base and a lift tower, the lift tower including a motorized lift system configured to move the harvester upward and downward. In addition to cutting plant stalks while moving upwards along the face of the hydroponic tower, the harvester also groups and collects the plant leafs.

19 Claims, 17 Drawing Sheets

(56) References Cited

U.S. PATENT DOCUMENTS

| | | | |
|---:|---|---|---|
| 9,864,396 B1* | 1/2018 | Brown | A01D 34/006 |
| 2005/0091957 A1* | 5/2005 | Stanners | A01D 46/20 |
| | | | 56/328.1 |
| 2018/0146618 A1* | 5/2018 | Elazary | A01G 31/06 |

* cited by examiner

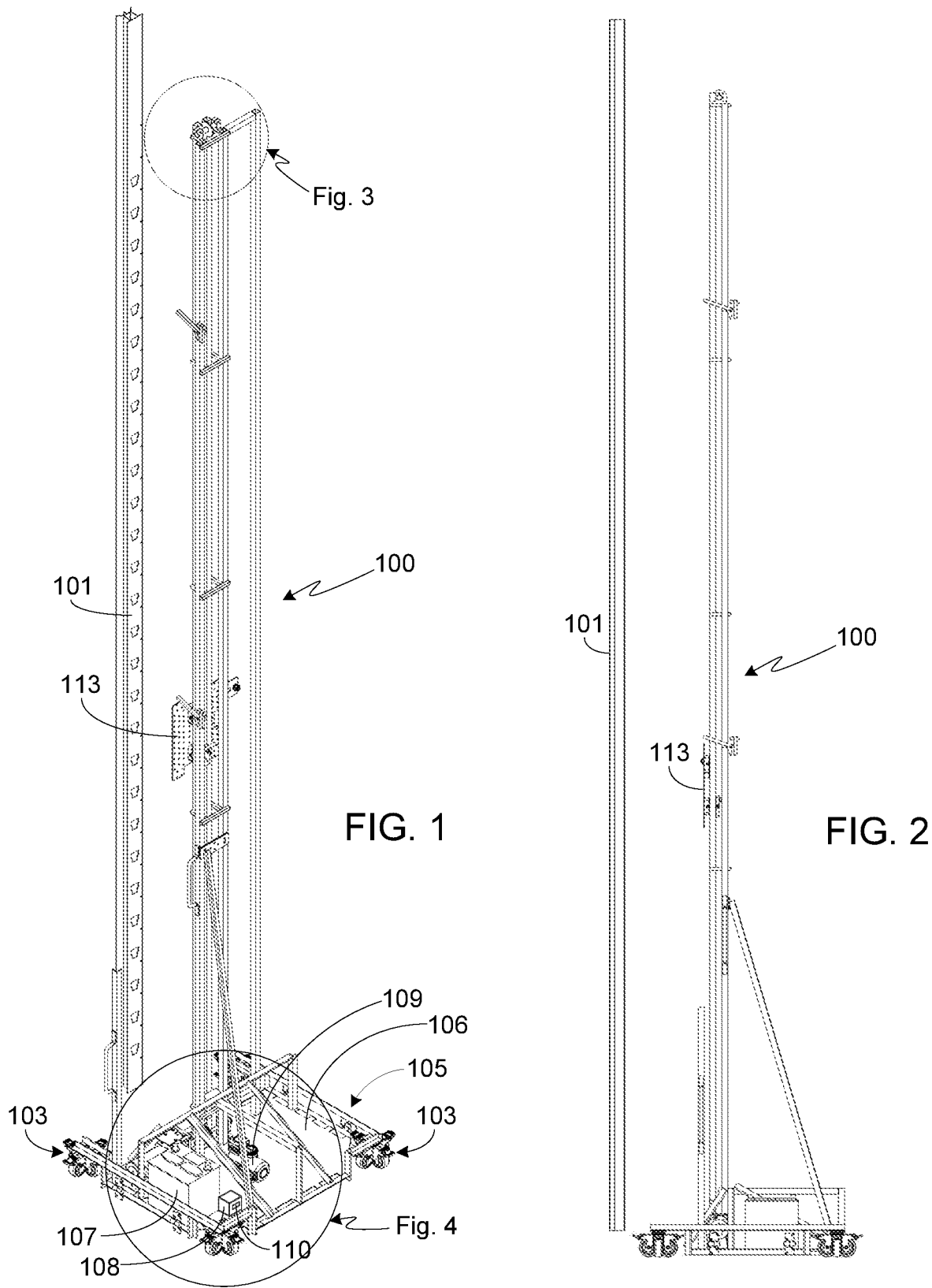

VERTICAL HYDROPONIC TOWER HARVESTING SYSTEM

FIELD OF THE INVENTION

The present invention relates generally to vertical hydroponic growing systems and, more particularly, to a harvesting system that is configured for use with vertical hydroponic towers.

BACKGROUND OF THE INVENTION

The continued growth of the world's population is increasingly taxing the ability of conventional farms to adequately feed everyone. In an attempt to ease this crisis, in recent decades there has been an increased use of pesticides and fertilizers. Unfortunately this dependence on pesticides and fertilizers has exacerbated the problem, leading to regions that are less favorable to farming and, in some instances, creating dead zones in waterways that are subject to runoff.

Since population centers and agricultural centers are frequently not co-located, and due to the time and expense associated with shipping agricultural goods, in many regions of the world only the wealthy are able to obtain adequate supplies of non-processed food, i.e., raw fruits and vegetables. Furthermore, the fruits and vegetables that do reach population centers are likely to be of decreased nutritional content and flavor, both due to the distance that they have traveled and the fact that much of today's produce is bred for durability and fertility rather than flavor and nutrition. As a result, there has been a renewed interest in soilless growing techniques that do not require the use of pesticides, drastically reduce the use of water, and allow for growing varietals that are bred for nutrition and flavor instead of durability.

Hydroponics is a soilless growing technique in which plants are grown using a liquid solution of water and nutrients. The roots of the plants are typically maintained in a fibrous or granular material, often comprised of plastic, and fed via a wick, drip, nutrient film, or other nutrient delivery system. Hydroponic growing systems are often established within indoor facilities, thus allowing them to be located in or near population centers. This approach also provides exceptional climate control (i.e., temperature, humidity, air flow, $CO_2$ concentration, light wavelength, intensity and duration, etc.) as well as improved pest and disease control, thus allowing an indoor hydroponic farm to succeed in a region in which the outside environment and/or the soil conditions are inhospitable to the use of conventional farming techniques. Furthermore, hydroponic and other soilless growing techniques can yield extremely high plant densities, especially in those instances in which either horizontal stacking systems or vertical growth towers are used.

While hydroponic farming techniques offer a number of advantages over conventional farming techniques, in order to achieve large-scale adoption of these techniques it is vital that the cost per plant be competitive with the costs associated with conventional farming techniques. Accordingly, the present invention provides a system that simplifies and allows automation of plant harvesting from a vertical hydroponic tower.

SUMMARY OF THE INVENTION

The present invention provides a plant harvesting system for use with a vertical hydroponic tower, the vertical hydroponic tower containing a plurality of vertically aligned plants, each of which includes a plant stalk and a plurality of leafs, the plant harvesting system including a payload transport system and a harvester. The payload transport system, which is configured to be positioned at a location adjacent to the vertical hydroponic tower, includes a base and a lift tower mounted to the base. The lift tower includes a motorized payload lift system configured to move an interface plate in upward and downward directions. The harvester, which is mounted to the interface plate via a mounting plate, harvests leafs from each of the vertically aligned plants as the motorized payload lift system moves the harvester upwards along the face of the hydroponic tower.

In one aspect of the invention, the harvester may include a pair of guides configured to maintain the harvester in a preset harvesting position relative to the hydroponic tower as the motorized payload lift system moves the harvester upwards along the face of the tower. The guides may be configured to capture a feature (e.g., a tower edge) of the hydroponic tower as the motorized payload lift system moves the harvester upwards along the face of the tower.

In another aspect, the harvester may include (i) an assembly of guide rails rigidly coupled to the mounting plate, the harvester movably coupled to the assembly of guide rails, and (ii) an actuator (e.g., pneumatic or electro-mechanical actuator) coupled to the harvester and the mounting plate, the actuator configured to move the harvester on the assembly of guide rails in a forward direction towards the hydroponic tower and in a rearward direction away from the hydroponic tower. The actuator moves the harvester forward in order to engage with the hydroponic tower and moves the harvester rearward in order to disengage from the hydroponic tower.

In another aspect, the harvester may include a plurality of guide surfaces that are configured to funnel the leafs from each of the plurality of vertically aligned plants away from the hydroponic tower as the harvester moves upwards along the face of the tower. The plurality of guide surfaces may be configured to funnel the leafs from each of the plurality of vertically aligned plants towards a central collection zone of the harvester as the harvester moves upwards along the face of the tower. The harvester may further include a guide slot located between first and second guide surfaces, the guide slot configured to accommodate the plant stalk from each of the plurality of vertically aligned plants as the harvester moves upwards along the face of the tower.

In another aspect, the harvester may include at least one plant stalk cutting blade configured to sever the plant stalk of each of the plurality of vertically aligned plants as the harvester moves upwards along the face of the tower. The blade is positioned in front of a leaf collection region of the harvester. The at least one cutting blade, which may be serrated or smooth, may be comprised of a stationary cutting blade(s), oscillating cutting blade(s), scissor cutting blade (s), or a spinning cutting blade(s). The harvester may be configured to collect the leafs as the stalks are cut, for example by directing the leafs towards a collection bin.

In another aspect, the harvester may include a pair of plant container removal wedges mounted to a front face of the harvester, the pair of plant container removal wedges configured to dislodge each plant container from the hydroponic tower as the harvester moves upwards along the tower's face.

In another aspect, the motorized payload lift system may include a drive motor that is coupled to the interface plate by either a chain or a cable. The base of the payload transport system may include a plurality of wheel assemblies (e.g., caster wheels, omnidirectional wheels, mecanum wheels, etc.) that allow the plant harvesting system to move between hydroponic towers. The payload transport system may include one or more travel limiting switches that are configured to interrupt operation of the motorized payload lift system when triggered. The payload transport system may include one or more one-way stops that are configured to allow free movement of the interface plate in an upward direction, while preventing free movement in a downward direction unless the one-way switch has been released.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

FIG. 1 provides a perspective view of a payload transportation system in accordance with the invention positioned next to a vertical hydroponic tower;

FIG. 2 provides a side view of the payload transportation system and the vertical hydroponic tower shown in FIG. 1;

DESCRIPTION OF THE SPECIFIC EMBODIMENTS

Figure 3:
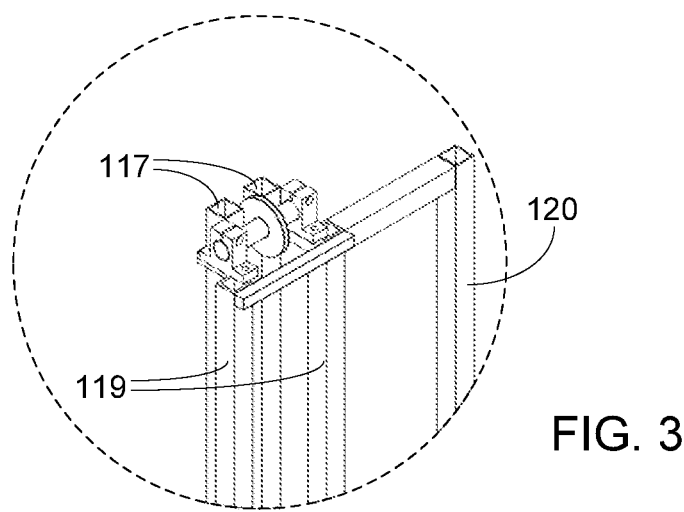
FIG. 3 provides a detailed perspective view of the top portion of the payload transportation system shown in FIGS. 1 and 2.
Figure 4:
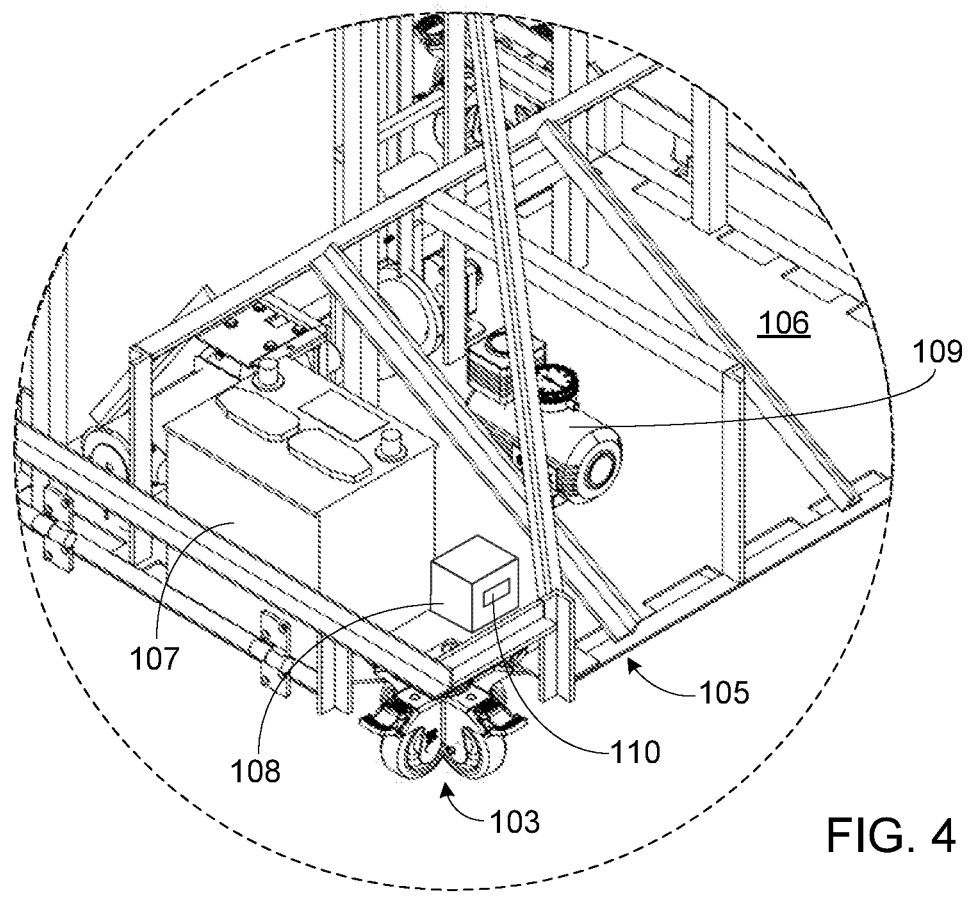
FIG. 4 provides a detailed perspective view of a portion of the base of the payload transportation system shown in FIGS. 1 and 2.

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

The present invention provides a payload transportation system that is designed to simplify planting within, and harvesting from, vertical hydroponic towers. As shown in FIGS. 1 and 2, the payload transportation system 100 (also referred to herein as a payload transport system and more simply as a transport system) is intended to be moved to a location near a vertical hydroponic tower 101. In one configuration, transportation system 100 is manually moved into place near the hydroponic tower in which planting, harvesting, maintenance or other activity is desired. In another configuration, the transportation system is automated, thus allowing it to be moved into place on a set schedule, for example based on a planting and/or harvesting schedule. In another configuration, the transportation system is semi-automated, thus allowing it to autonomously move into place near the intended tower, but only when commanded to do so by the system operator.

At each corner of the base of the payload transportation system 100 is a wheel assembly 103. Although wheel assemblies may be designed to provide limited directional movement of system 100, for example lateral motion only, preferably wheel assemblies 103 as well as the means used to steer the system are designed to allow the transportation system to move in forward, rearward and side-to-side directions as well as rotating about a central axis as needed, thereby insuring that the system can navigate between hydroponic towers with minimal tower spacing while being easily aligned with the intended target tower. Omni-directional travel is represented in the figures as multi-wheel castor assemblies 103 located at each corner of the system's base. Preferably each wheel assembly 103 is comprised of a single caster wheel, an omnidirectional wheel, a mecanum wheel, or other wheel capable of providing omni-directional motion.

Depending upon whether the payload transportation system is configured for manual operation or automated/semi-automated operation, the wheels of transportation system 100 may or may not be motorized. In the non-motorized configuration, preferably caster wheels are employed. It should be understood, however, that motorized wheels are preferred even on the manually operated transportation system, thus simplifying movement of the payload transportation system and allowing anyone, regardless of size or strength, to easily and safely move the system into place. If the corner wheel assemblies are motorized as preferred, preferably each wheel assembly is individually powered by a brushless DC servo motor. If desired, positional feedback for each wheel may be provided by a hall effect sensor, an optical encoder, or other means.

The sensing system(s) required to navigate the payload transportation system 100 along a row of vertical hydroponic towers or between towers, or to align the payload transportation system 100 adjacent to an intended tower, is determined in large part by the degree of automation in use with the system. For example, if the transportation system is manually moved between towers, or between a tower and a work station (e.g., plant loading or unloading station), then only limited sensing is required. Typically in this scenario the sensing systems are only required to (i) prevent the payload transportation system 100 from becoming too close to, or actually colliding with, a tower and/or work station and (ii) properly aligning the payload transportation system 100 with the intended tower and/or work station. Alternately, if the payload transportation system is operating in a semi- or fully-automated fashion, a more complex sensing(s) is required to allow the system to not only navigate without collision, but also to locate specific towers and/or work stations within the general farming environment. Preferably such a complex sensing system(s) is also configured to be capable of rapidly acquiring location information on moving objects such as workers and other moving equipment (e.g., other payload transportation systems). Typically in this scenario a sensing system similar to that used to provide autonomous control in a car may be used, although the data acquisition speed and sensor sophistication for the disclosed transport system is less than that required for a car given the transport system's low rate of travel relative to that of a car. Sensing systems may use any of a variety of detection schemes (e.g., camera-based, radar, lidar, projected UV-based, ultrasonic-based, structured light-based, etc.), GPS and inertial navigation systems, proximity detectors (e.g., infrared, capacitive, inductive, magnetic, optical, etc.), and various other means of monitoring system location (e.g., magnetic strips, encoder tape, etc.).

Payload transportation system 100 includes a base 105 to which the wheel assemblies are mounted. Base 105 may be comprised of a plate, for example an aluminum or steel plate, or the base may be comprised of a framework of cross members. In at least one embodiment, base 105 is comprised of a framework of cross members as well as a plate 106. Preferably mounted to the base are the components necessary for movement of the payload transportation system as well as operation and use of the various attachments that may be coupled to the payload interface as described below (e.g., planter, harvester).

The components which must be mounted to base 105 rather than being separately housed depend, at least in part, on whether transportation system 100 is intended to operate in a completely autonomous mode, or is intended to be tethered to a control system. Although not preferred, if the transport system is tethered to an external control system, the tethering harness may include power cables to allow operation of motorized wheel assemblies as well as the powered lift described below, air lines to operate payloads requiring compressed air as described below, and control lines coupling an off-board control system to the on-board sensors and motors. Preferably, however, transport system 100 is untethered.

If transport system 100 is untethered as preferred, a power source 107 is mounted to base 105. Depending upon the desired run time between charging cycles, power source 107 may be comprised of a single 6 or 12 volt battery similar to that used in a conventional car; alternately, multiple 6 or 12 volt batteries operating in series or parallel; alternately, a battery pack comprised of a plurality of batteries. Assuming untethered operation, a controller 108 is also mounted to base 105. Controller 108 includes a central processing unit (CPU) as well as memory (e.g., EPROM, EEPROM, flash memory, RAM, solid state drive, hard disk drive, or any other type of memory or combination of memory types) for storing instructions, system limits (e.g., upper and lower limits for the payload lift), etc. A user interface 110 is coupled to controller 108, interface 110 providing means for a user to operate transport system 100. Interface 110 may also provide an interface for installing new system instructions as well as software updates.

In at least one configuration, an air compressor 109 is also mounted to base 105, where air compressor 109 is used to supply compressed air via a pneumatic line to one or more of the farming attachments mounted to the transport system as described in further detail below. In some embodiments, air compressor 109 may be replaced with, or work in tandem with, an air tank. In those embodiments utilizing an air tank to operate the pneumatic systems, the air tank may either be filled using on-board compressor 109 or filled intermittently using an externally located compressor. When filled using an external compressor, the external compressor is preferably co-located with the charging system used to charge on-board power source 107.

Attached to base 105 is a motorized payload lift system used to vertically move the payload attached to the transport system, thus allowing the payload to be placed adjacent to any location on the vertical hydroponic tower. The payload, for example a sensor (e.g., temperature, humidity, air quality, or other sensor), planter or harvester, is attached to a payload interface plate 113. The interface plate 113 is attached via slide assemblies 115 to tower guide rails 117, and preferably to a pair of tower guide rails 117. In order to provide sufficient tower strength and stiffness, preferably in addition to guide rails 117 the tower includes at least a second pair of tower support members 119. To minimize weight while still achieving the desired level of strength and stiffness, preferably all of the tower uprights, i.e., tower guide rails 117 and tower support members 119, are comprised of stainless steel tubes of circular, square or rectangular cross-section. Rails 117 and members 119 may also be comprised of aluminum, a composite material, or any other material that provides the desired levels of strength and rigidity.

In order to simplify tower maintenance, preferably the tower can be lowered. In the preferred embodiment, the tower members, or a subset of the tower members, are attached to the base via hinge members (e.g., pins) as well as more rigid couplings (e.g., bolts). Then, when it is necessary to clean or service the tower, the rigid couplings are released and the tower is pivoted relative to the base using the hinge members.

Figure 5:
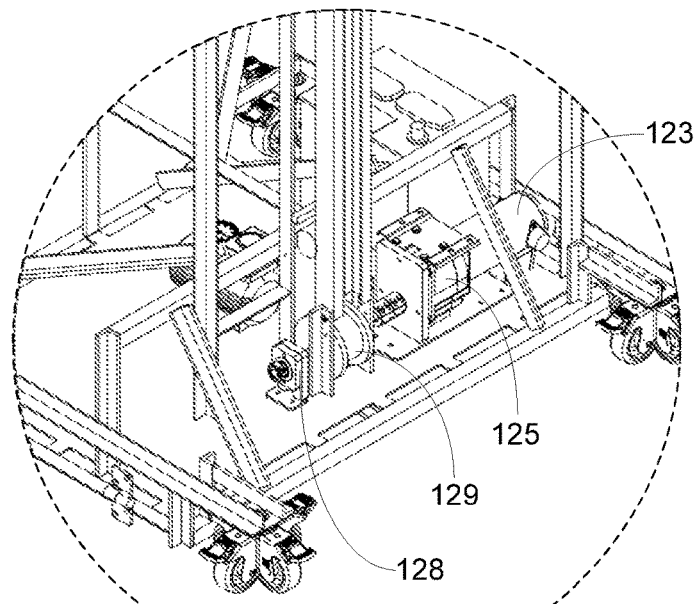
FIG. 5 provides a detailed perspective view of a portion of the base of the payload transportation system, this view illustrating the lift elevator drive motor with a capstan.
Figure 6:
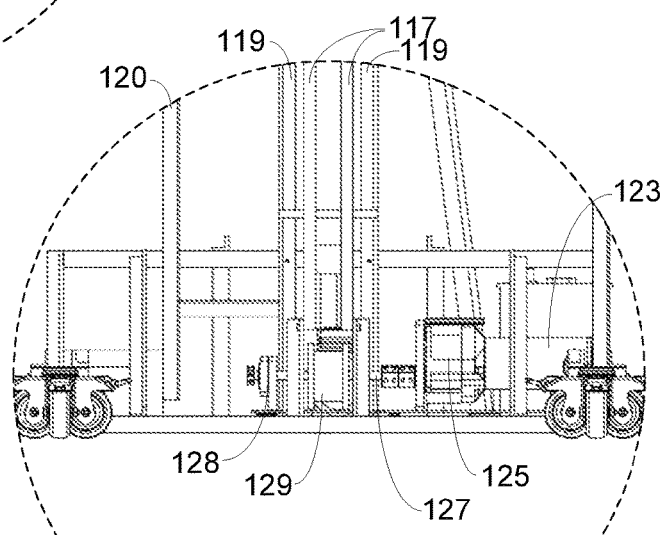
FIG. 6 provides a front view of the portion of the base of the payload transportation system shown in FIG. 5.
Figure 7:
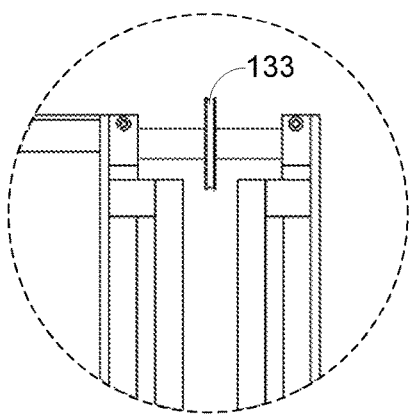
FIG. 7 provides a front view of the idler pulley used with the drive motor assembly shown in FIGS. 5 and 6.
Figure 8:
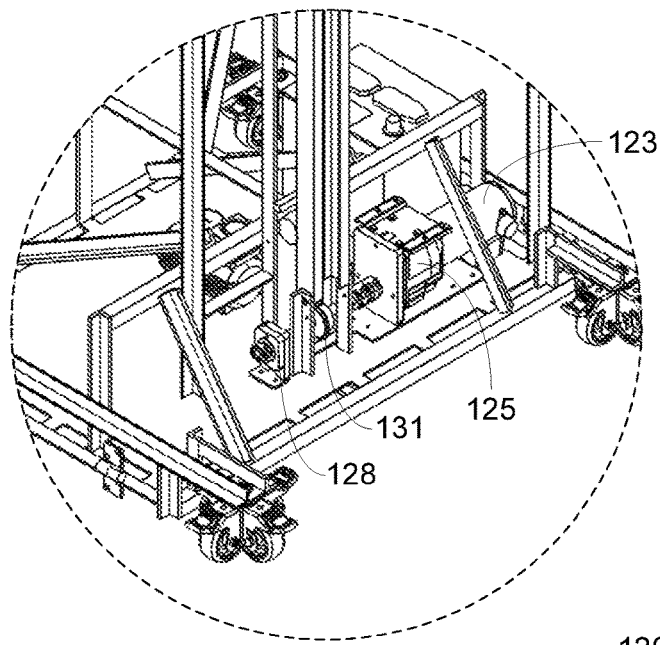
FIG. 8 provides a detailed perspective view of a portion of the base of the payload transportation system, this view illustrating the lift elevator drive motor with a drive sprocket.
Figure 9:
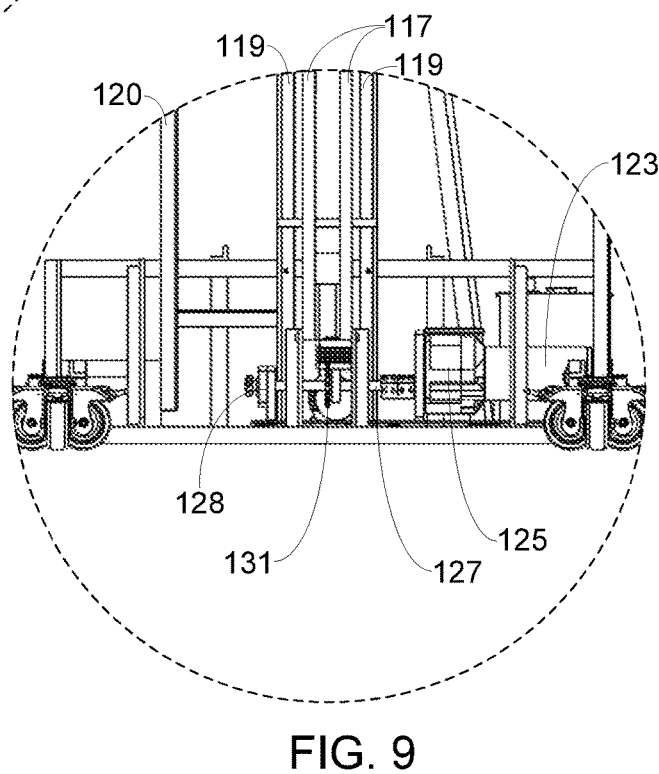
FIG. 9 provides a front view of the portion of the base of the payload transportation system shown in FIG. 8.
Figure 10:
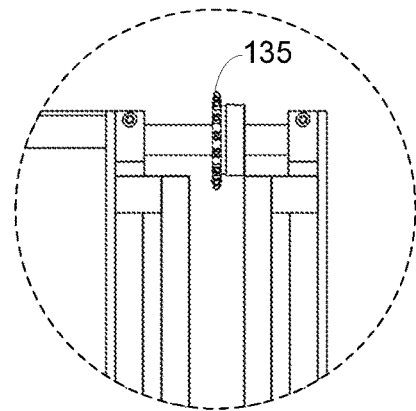
FIG. 10 provides a front view of the idler sprocket used with the drive motor assembly shown in FIGS. 8 and 9.

To move interface plate 113, and thus the attached payload, to any desired location along the vertical hydroponic tower, the interface plate is attached to a cable or chain. For clarity, neither the cable nor the chain is shown in the figures. The chain, or cable, is coupled to a drive motor 123 mounted to base 105. In the preferred embodiment, a face mounted reducing gearbox 125 is mounted to drive motor 123. The free end of output drive shaft 127 is supported in pillow block 128. Attached to output drive shaft 127 is either a capstan 129 (see FIGS. 5 and 6) if the system utilizes a cable, or a drive sprocket 131 (see FIGS. 8 and 9) if the system utilizes a chain. Preferably output drive shaft 127 is keyed, as is capstan 129 or sprocket 131, thus preventing slippage. The cable, which is preferably comprised of a vinyl coated, braided, stainless steel cable, runs up the length of the linear elevator system and around idler pulley 133 (see FIG. 7). Similarly, if the system utilizes a chain, the chain runs up the length of the linear elevator system and around idler sprocket 135 (see FIG. 10).

In a cable connected system, to prevent slippage the cable is wrapped around the capstan multiple times; typically on the order of four wraps about capstan 129. The end of the cable is attached to interface plate 113. The weight of interface plate 113, along with the attached payload, is sufficient to provide the necessary tension to the cable system. In this configuration, as output drive shaft 127 rotates, the cable wraps around capstan 129, thereby shortening the cable length and pulling interface plate 113 upwards. In the preferred embodiment, capstan 129 has a diameter of 3 inches, providing the desired balance between torque and ascent/descent rate. Idler pulley 133 preferably has a minimum diameter of 2 inches, thereby avoiding unnecessary stress concentrations within the cable that would occur if the idler pulley's diameter were too small, and which could lead to early elevator lift failures.

In a chain connected system, the chain forms a loop around drive sprocket 131 and idler sprocket 135. Interface plate 113 is bolted to the chain. In order to optimize performance in this embodiment, chain tension is varied, for example by adjusting the height of the idler sprocket. In at least one embodiment, a spring loaded idler sprocket is used to create consistent, easily manipulated tension. As in the cable connected system, drive sprocket 131 is sized to achieve the desired balance between torque and ascent/descent rate. In one embodiment, both drive sprocket 131 and idler sprocket 135 have an outside diameter of 2 inches, with the drive sprocket having 11 teeth.

Regardless of whether the payload lift system is cable based or chain based, preferably the system utilizes one or more travel limiting switches that interrupt operation of the lift motor when triggered, thus preventing system damage if a control signal is provided to the lift motor (i.e., drive motor 123) that attempts to raise or lower the lift platform past its physical limits. In the preferred embodiment, a pair of limit switches is provided at either end of lift travel, thereby providing redundancy. The limit switches may be electro-mechanical, electromagnetic, optical, inductive or other type of switch. If a pair of limit switches is used at either end of travel, each pair may utilize the same type of switch or different types of switches. It will be appreciated that in addition to travel limit switches mounted at the top and bottom of the lift elevator, limit switches may also be employed with drive motor 123 where the drive motor limit switches monitor and limit the number of allowed rotations in either direction for output drive shaft 127.

As previously noted, the lift system of transport 100 utilizes an interface plate 113, thus allowing various attachments, i.e., payloads such as planters and harvesters, to be used as required. Preferably a harness extends between transport base 105 and interface plate 113, the harness providing the necessary connections to operate any of the potential payloads. For example, the harness may include one or more power lines (e.g., 5 volt, 12 volt, etc.) connected to either power source 107 or a different power source, pneumatic lines coupled to the on-board compressor or air tank, and signal lines connected to controller 108. The harness is preferably attached to a guide (e.g., guide tower member 120), thus constraining the harness and preventing it from becoming tangled or otherwise compromised.

To prevent the interface plate and the associated payload from free-falling, potentially damaging personnel and/or equipment, preferably one-way stops are mounted to the lift tower. These stops are configured to allow interface plate 113 to move freely upwards while preventing plate 113 from moving downwards, past a given stop, unless the stop has been released. In at least one embodiment of the invention, the tower includes two stops, the first positioned at the top of interface plate travel and the second positioned at approximately 7 feet above the ground which is comfortably above head level for a payload transportation system operator or other personnel.

Figure 11:
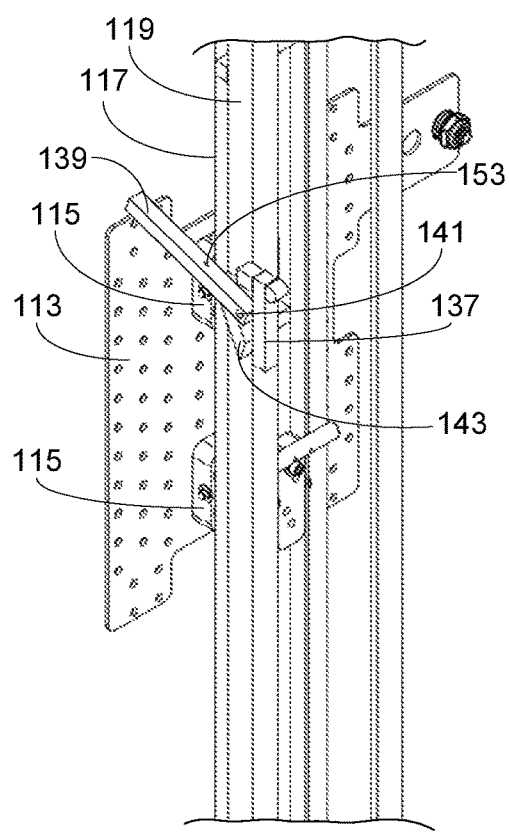
FIG. 11 provides a perspective view of a preferred embodiment of the one-way stop used with the lift elevator of the payload transportation system.
Figure 12:
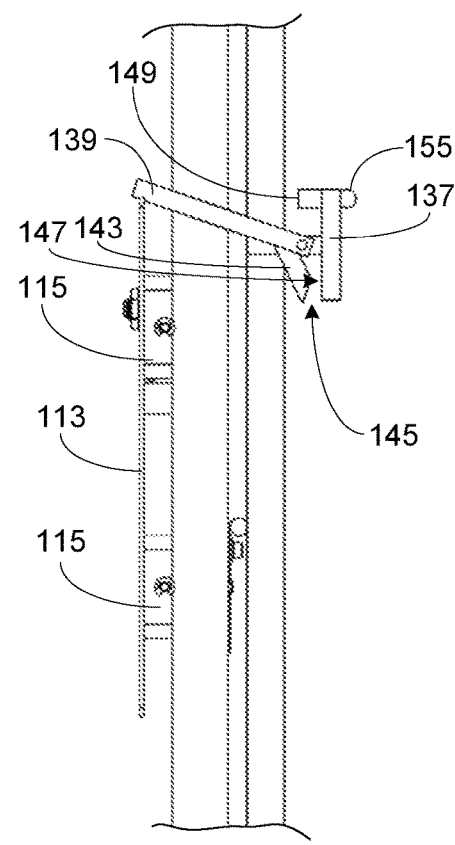
FIG. 12 provides a side view of the assembly shown in FIG. 11.

FIGS. 11 and 12 illustrate a preferred configuration for a one-way stop. The stop, made from stainless steel and attached (e.g., welded) to one of the tower upright members 119, includes a base member 137 and a lever member 139. Base member 137 is mounted to upright member 119 and constrains the range of motion of lever 139. Lever 139 is pinned (e.g., pin 141) to base member 137 such that it can rotate freely. Mounted to the lever is a downwardly angled member 143, configured such that lever 139 and angled member 143 move as one. Angled member 143 defines the lower limit of motion for lever 139. Note that in FIGS. 11 and 12, interface plate 113 is in contact with lever 139 and moving the lever upwards. As such, in these figures there is a space 145 between lever 139 and contact surface 147 of base member 137. In the illustrated configuration, lever 139 is horizontal when it reaches the lower limit of permitted travel as defined by member 143. In addition to defining the lower travel limit, base member 143 also defines the upper travel limit of lever 139. As shown, protrusion 149 of base member 143 prevents lever 139 from rotating about pin 141 and reaching a vertical position.

In order to allow the release of the stop, preferably a control cable, for example a braided stainless-steel cable, is attached to lever 139 at a point 153. In one configuration, the control cable is attached to the lever by routing it through a hole in the lever and then crimping it. The control cable runs over a rounded portion 155 of base member 143. Alternately, the control cable may run through a hole in the base member, along a groove in the base member, or otherwise be directed past the base member. After passing over the base member, the cable runs downward where it is attached to a spring-loaded handle (not visible in this figure). In the handle's neutral position, the cable is un-tensioned so that lever 139 rests in its horizontal position. When the handle is pulled, the cable is tensioned and lever 139 lifts up, allowing passage of interface plate 113. If the lever is not pulled and the interface plate is moving downwards, the plate edge will hit the lever, thereby arresting its motion. When interface plate 113 is moving upwards, it deflects the lever out of the way. In at least one embodiment, the spring-loaded handle is replaced with an actuator, allowing manual operation of the lever to be replaced with automated operation.

Harvester Payload

Figure 13:
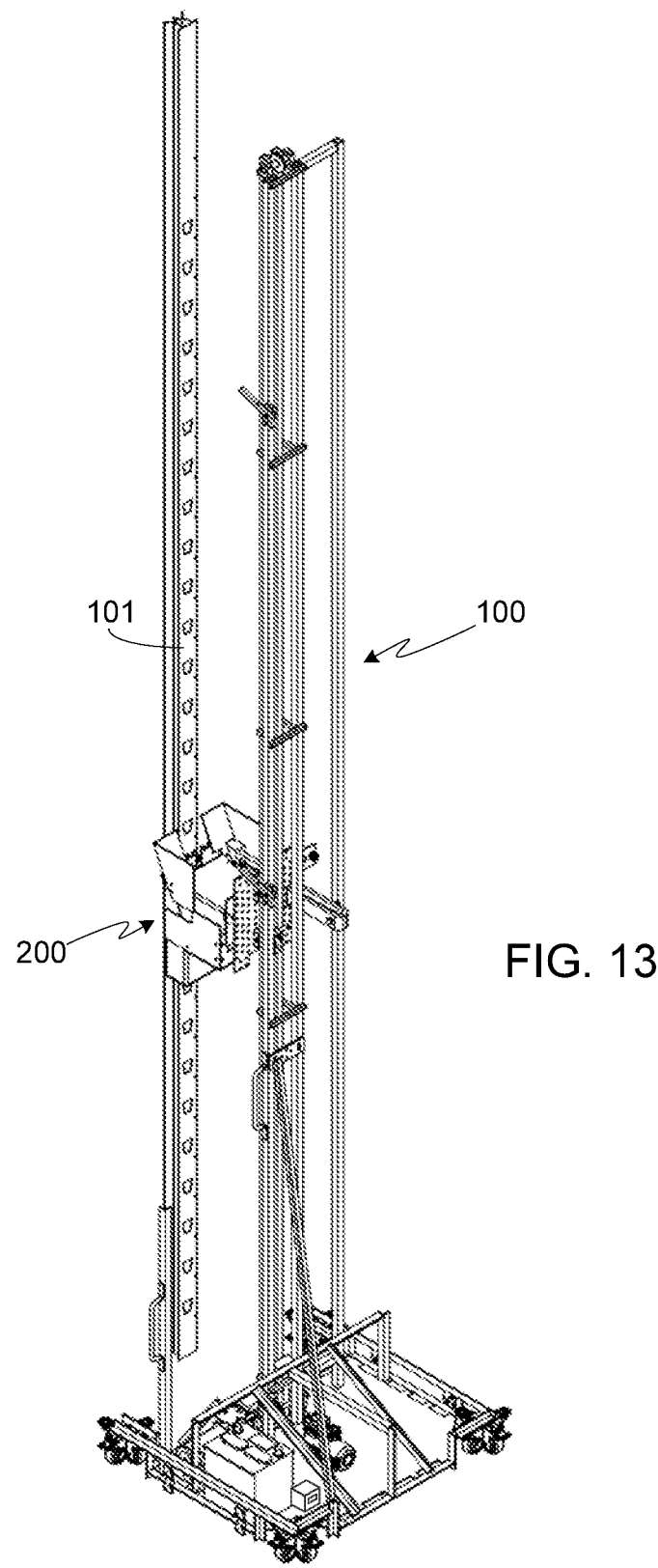
FIG. 13 provides a perspective view of the payload transportation system of the invention with a harvester attachment positioned next to a vertical hydroponic tower.
Figure 14:
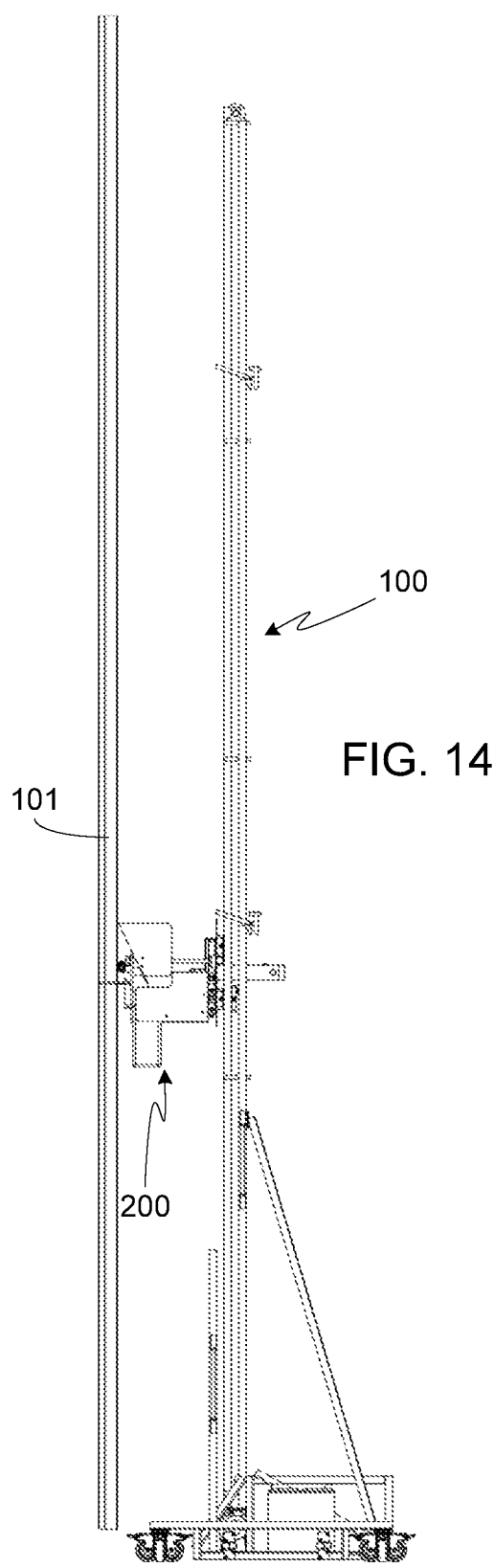
FIG. 14 provides a side view of the assembly shown in FIG. 13.
Figure 15:
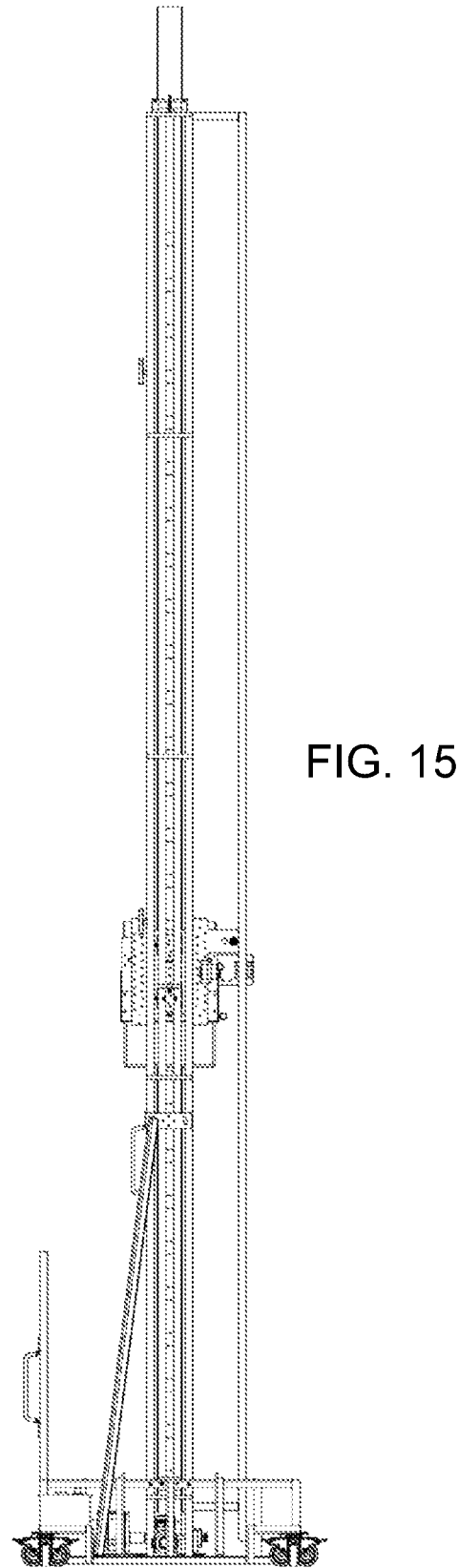
FIG. 15 provides a rear view of the assembly shown in FIGS. 13 and 14.
Figure 16:
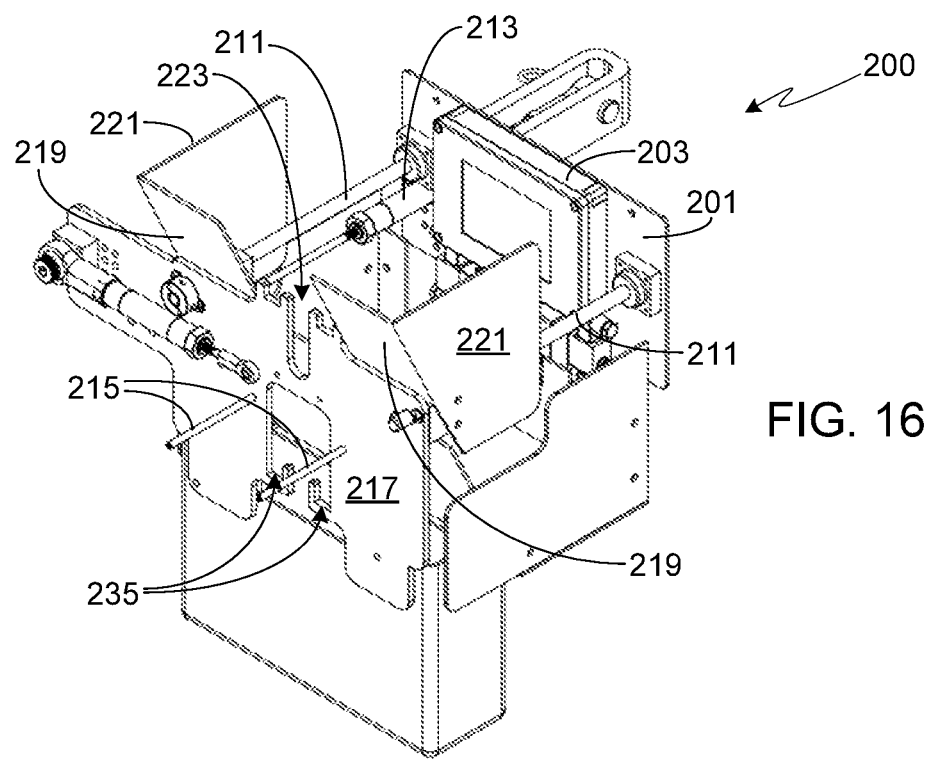
FIG. 16 provides a perspective view of a harvester attachment.
Figure 17:
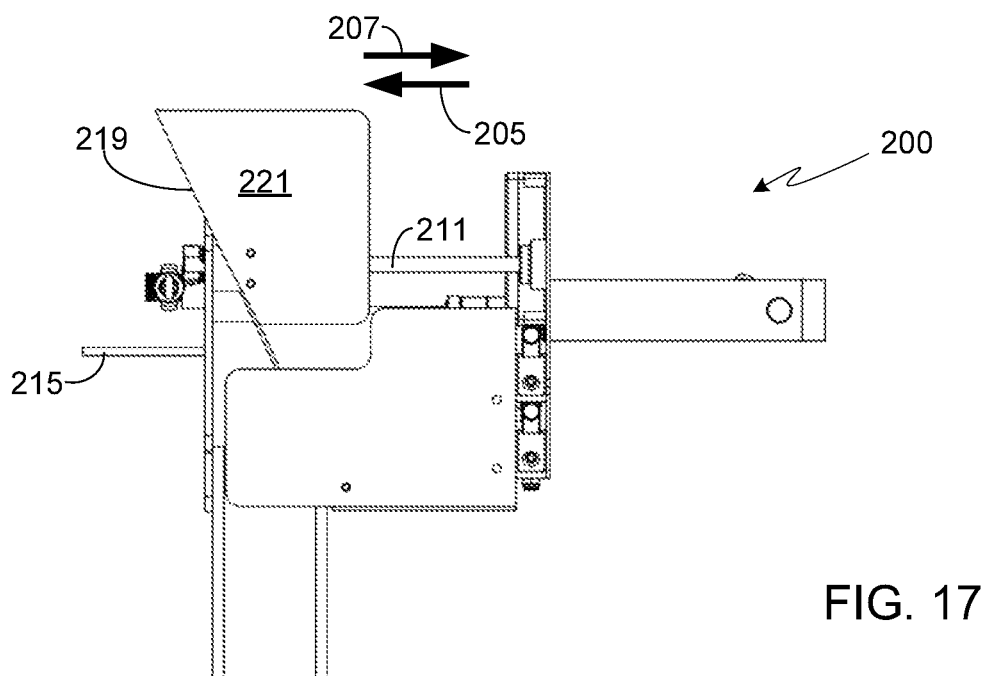
FIG. 17 provides a side view of the harvester attachment shown in FIG. 16.

FIGS. 13-15 provide perspective, side and back views, respectively, of a harvester payload 200 attached to interface plate 113 of payload transportation system 100. Harvester 200 is shown in position for harvesting plants, not shown, within vertical tower 101. FIGS. 16 and 17 provide perspective and side views, respectively, of harvester 200.

Harvester 200 includes a mounting plate 201. Mounting plate 201 is configured to be mounted to interface plate 113 of transport system 100. Plate 201 can be configured to be mounted to interface plate 113 using bolts, clips, hooks or other means.

As previously noted with respect to payload transport system 100, the system can be configured to operate autonomously, semi-automatically or manually. When operated autonomously or semi-automatically, preferably the harvester 200 communicates with the transport system 100 in order to properly position the transport system and the harvester relative to tower 101, locate the harvester at different vertical positions on the tower, and operate the functionality associated with the harvester and discussed further below. While the control system for such operation can be solely maintained within controller 108, preferably some of the control for the harvester 200 is included in an on-board controller 203. Controller 203 includes a processor as well as sufficient memory (e.g., EPROM, EEPROM, flash memory, etc.) for storing instructions. Controller 203 can be used to monitor sensors located on the harvester, for example sensors that monitor the operational state of the harvester, whether or not the harvester is properly engaged with the tower, location of the harvester relative to the tower, operation of the harvester's on-board cutting tools, current capacity of the harvester's leaf collection system, etc. The information acquired by controller 203 can be used to directly control the functionality of the harvester and the transport system, or the acquired information can be transmitted via the payload harness to controller 108, and controller 108 can direct operation of the harvester and transport system.

Regardless of whether harvester is manually controlled or utilizes a control system maintained within controller 108, controller 203, or some combination of the two controllers, the harvester (alone or in combination with transport system 100) is configured to perform a variety of operational maneuvers. These operational maneuvers include:

Positioning the payload transport system 100 in the appropriate position relative to hydroponic tower 101. As previously noted, a variety of sensor types can be used to monitor the relative locations of the transport system and the intended tower, thereby allowing the transport system to be properly positioned.

In the preferred embodiment, harvester 200 is capable of moving forward (i.e., extended in direction 205) or rearward (i.e., retracted in direction 207) relative to interface plate 113. In this embodiment, the front portion 209 of the harvester slides along rails 211. Preferably rails 211 are cylindrically-shaped. The position of the front harvester portion is governed by a pneumatic actuator 213, which is connected to the transport system's on-board air supply (e.g., air compressor 109). Electro-mechanical actuators can also be used to control the position of the front harvester portion. Preferably when the transport system is moving between towers, harvester 200 is retracted. Once the transport system is properly positioned relative to the intended tower, the front portion 209 of the harvester is extended, thereby placing it in position relative to the front face of the tower for harvesting. Note that as shown in FIG. 15, the harvester is much wider than the tower. This is to ensure that the harvester collects all of the plant growth. In a preferred embodiment, a pair of guides comprised of locating pins 215 extend from harvester face 217 and are configured to rest against either side of tower 101. Alternately, a pair of guides, such as those disclosed below with the planter payload, may be configured to grip a tower edge or lip. A hydroponic tower with a suitable front face lip is disclosed in co-assigned and co-pending U.S. patent application Ser. No. 15/968,425, filed 1 May 2018, the disclosure of which is incorporated herein for any and all purposes. Alternately, the pair of guides may utilize rollers or wheels that are configured to rest within grooves located on either side of the tower. A hydroponic tower with suitable V-grooves located on either tower side is disclosed in co-assigned and co-pending U.S. patent application Ser. No. 15/910,601, filed 2 Mar. 2018, the disclosure of which is incorporated herein for any and all purposes.

As previously noted, harvester 200 may be engaged with the tower manually or automatically. Once harvester 200 is engaged, i.e., the harvester is properly located and in the extended position, the transport system 100 moves interface plate 113, and thus harvester 200, either in an upwards or downwards direction. Moving the harvester upwards results in plant leafs being grouped, cut and collected as described below. Upwards harvester movement can also be used to remove plant containers, also described below.

In a non-automated embodiment of the system, an operator controls harvester movement. If the system is operating in a fully manual mode, the operator takes complete control of harvester movement once the harvester has been engaged, for example using a joystick to move the harvester via interface plate 113 upwards or downwards along the tower guide rails 117. If the system is operating in a semi-autonomous mode, then the operator is primarily monitoring automated operation of the harvester. In this approach the operator merely activates the harvester by pressing, or otherwise engaging, a dead-man switch. If the operator disengages the dead-man switch, for example by releasing the switch, the harvester immediately suspends action. Once engaged, the harvester automatically moves upwards performing the steps of grouping, cutting and collecting leafs. Assuming that the operator continues to engage the dead-man switch, the harvester continues to move upwards until a limit switch, such as those discussed above, is activated. Alternately, the harvester can utilize an on-board sensor to monitor its location relative to the tower, stopping upward movement when it determines that the top plant has been harvested. Once the system determines that the harvester is at the top of the tower or that the top plant has been harvested, preferably the system is configured to immediately begin moving the harvester downwards.

Using harvester 200, the first step of plant harvesting is to group leafs together. Leaf grouping is important for several reasons. First, it is important to minimize leaf damage during harvesting to ensure that the produce delivered to the end consumer is of the highest quality. By grouping leafs and exposing the plant stalks, stalks rather than leafs are primarily cut during the harvester's cutting step. Second, leaf grouping helps to ensure that most, if not all leafs that are removed during the cutting stage are successfully collected, thereby minimizing waste.

In the preferred embodiment, a pair of guide surfaces 219, preferably fabricated from plastic, funnel leafs away from the tower and towards the harvester. Preferably the guide surfaces 219 rest against the face of the tower when the harvester is engaged, thus ensuring that leafs that are near to or lying against the tower face are successfully pulled away from the face. By angling surfaces 219 as shown, as the harvester moves up the tower, these surfaces gently guide leafs away from the tower. Side guide surfaces 221 help to funnel the leafs inward, thus ensuring that once cut, the leafs will be successfully collected. Guide surfaces 219 and 221 can either be flat as shown, or contoured. Note that in the illustrated embodiment, a guide slot 223 is located at the base of guide surfaces 219, slot 223 sized to accommodate the plant stalks and to minimize their movement during the following cutting step.

While the use of guide surfaces is the preferred method for leaf grouping, it should be understood that non-passive techniques may also be used, either alone or in combination with the above-described guide approach. Active techniques include blowing on the leafs with compressed air, where the air is directed behind the leafs in order to blow them away from the tower and towards the harvester. A vacuum can also be used, where the vacuum inlet is mounted on the harvester such that it pulls the leafs away from the tower and towards the harvester. Lastly, soft bristled rollers can be used to peel the leafs away from the tower surface.

After grouping the leafs and properly locating the plant stalk, for example locating the plant stalk in slot 223, the plant stalk is cut using either a single blade or a pair of blades. The inventors have found that the harvester can use a variety of different blade and actuator types, and that the preferred type is often dependent on the particulars of the plant in question (e.g., thick versus thin stalk, rigid versus flexible stalk, etc.). Some of the types of cutters appropriate for use include:

Stationary Blade: In this configuration the stationary blade is mounted to the front of the harvester, preferably on harvester face 217. The blade can be smooth or serrated. Preferably the blade is mounted at an angle relative to vertical, for example at 45 degrees, thus causing the blade to slice through the stalk as the harvester moves in an upward direction. This cutter works best with stalks that are relatively rigid and resist bending.

Oscillating Blade/Blades: In this configuration the blade oscillates, thus providing a more robust cutting tool in comparison to the stationary blade. Blade oscillation can be purely linear (i.e., a reciprocating linear motion) or elliptical (i.e., combining a linear motion with an up/down motion). When dual blades are used, preferably one of the blades oscillates while the second blade remains static. The blade(s) can be smooth or serrated.

Scissor Blades: In this configuration a pair of blades, either smooth or serrated, are operated in such a manner that the stalk is simultaneously cut and sheared. The blades can be configured such that one blade pivots, both blades pivot, or one or both blades move in opposite directions in a guillotine motion. The scissor blade(s) can be pneumatically or electrically operated. Preferably the harvester is stopped during the cutting action when scissor blades are used, thereby having the disadvantage of (i) slowing down the harvesting process and (ii) requiring a more complicated vertical lift control system.

Figure 18:
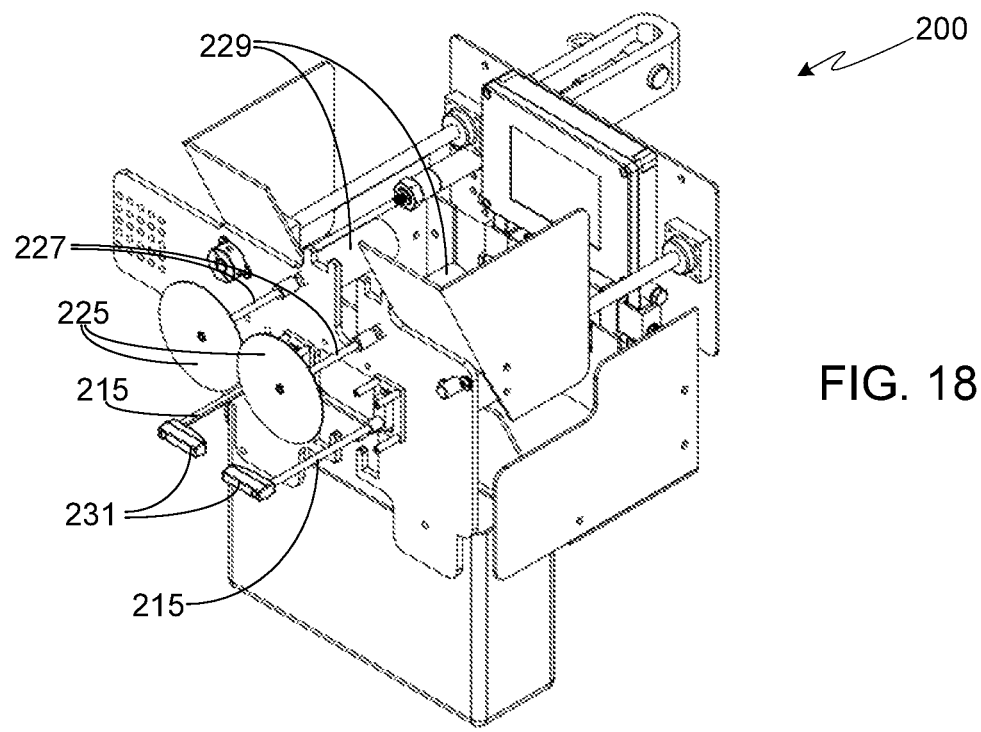
FIG. 18 provides a perspective view of the harvester attachment shown in FIGS. 16 and 17 with the inclusion of cutting blades.

Spinning Blade/Blades: In this configuration a spinning blade, or more preferably a pair of spinning blades, is used to cut each plant stalk as the harvester moves upwards along the tower. FIG. 18 provides a perspective view of this cutter. As shown, harvester 200 includes a pair of rotating blades 225. Blades 225 are coupled via drive shafts 227 to motors 229. The blades, which can be smooth or serrated, can be configured to rotate in either direction, thus either pulling each stalk downwards as it is cut, or pushing each stalk upwards in a direction opposite that of the harvester. In general, this approach provides smooth stalk cuts while maximizing harvester travel speeds.

Note that in the embodiment illustrated in FIG. 18, each locating pin 215 includes an end member 231. In this embodiment, locating pins 215 are rotatable, thus allowing the pins to rotate and capture a feature on the tower (e.g., face plate edges) to ensure that the harvester remains properly positioned relative to the tower face throughout the harvesting steps.

Once the plants have been cut, efficient collection of the cut leafs is the next step. As noted above, the leaf grouping step directs the leafs towards the center of the harvester (i.e., towards a central collection zone). Therefore once the leafs are directed towards the center of the harvester and the stalks have been cut, the leafs fall through the bottom of the harvester. Preferably a collapsible chute is attached to the bottom of the harvester, the collapsible chute directing the cut leafs towards a collection bin mounted to base 105 of transport system 100. The collapsible nature of the chute allows it to easily move up and down with the harvester without inhibiting motion of the payload lift system. In an alternate embodiment, the bottom of harvester 200 includes a door. During the grouping and cutting steps, leafs are collected within the harvester, i.e., the door is closed. Periodically, for example after all of the plants within a single tower have been grouped, cut and collected, the door is opened and the collected leafs are dropped into a suitable bin or basket. Preferably the door is only opened when the harvester is close to the collection bin/basket, for example when the harvester is at the bottom of the transport system's lift, thus minimizing damage to the leafs. In this configuration, the door on the bottom of the harvester may be operated manually, or it may include an actuator that allows it to be opened and closed remotely, for example during autonomous or semi-autonomous system operation.

Figure 19:
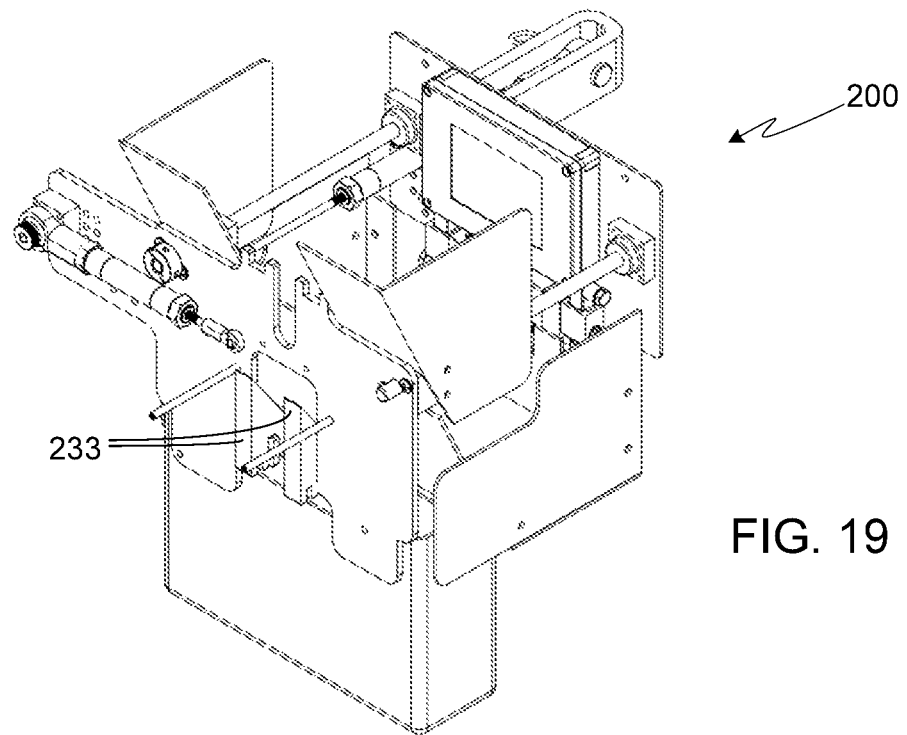
FIG. 19 provides a perspective view of the harvester attachment shown in FIGS. 16 and 17 with the inclusion of plant container removal members.
Figure 20:
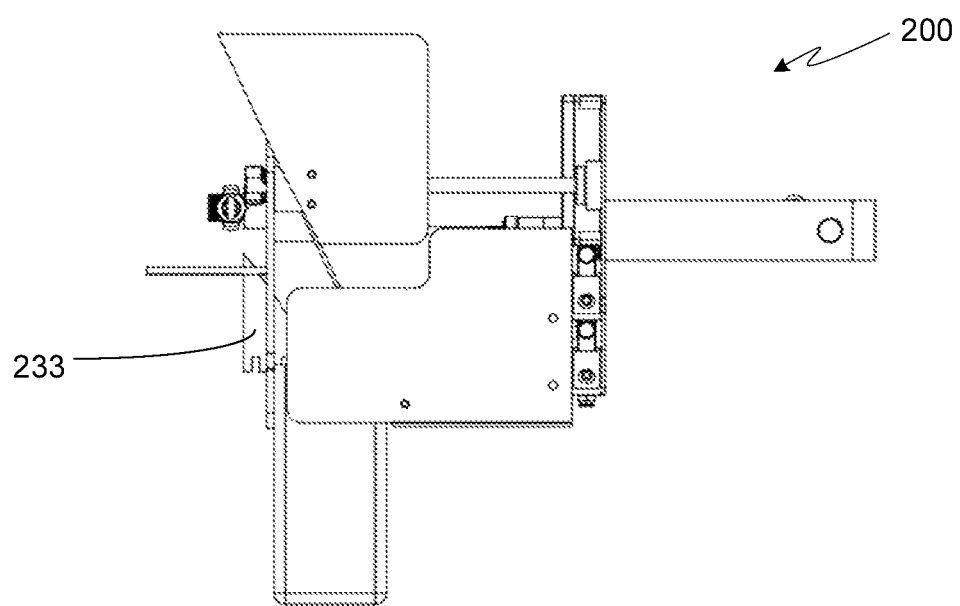
FIG. 20 provides a side view of the harvester shown in FIG. 19.

In addition to harvesting plants, harvester 200 can be configured to remove the plant containers themselves. FIG. 19 provides a perspective view of harvester 200 with the inclusion of a pair of plant container removal wedges 233 mounted to front harvester face 217. FIG. 20 provides a side view of the same harvester configuration. Wedges 233 are configured to slide against the face of the hydroponic tower 101 and slip under a flared edge on the plant container. Given the shape of wedge members 233, as the harvester moves upward, the leading edge of each wedge slides under the bottom of the flared plant container edge. As the harvester continues to move upwards, wedge members 233 gently pull out the plant container from the tower. Once removed, the plant container falls into a receiving basket attached to the harvester. Since wedge members 233 are mounted below the cutters, plant container removal can either be performed at the same time as the cutting step, or the plant containers can be removed in a subsequent step. Given that the plant container removal step may or may not be performed at the same time as the cutting step, in the preferred embodiment wedge members 233 are interference fit within a pair of slots 235 formed in harvester face 217, thereby requiring minimal time to add or remove the wedges from the harvester. It should be understood that the plant container removal aspect of the present invention is not limited to use with a single plant container design. Exemplary plant containers that can be used with the harvester's plant container removal wedges are disclosed in co-pending and co-assigned U.S. patent application Ser. No. 15/910,308, filed 2 Mar. 2018, and Ser. No. 15/910,445, filed 2 Mar. 2018, the disclosures of which are incorporated herein for any and all purposes.

Planter Payload

Figure 21:
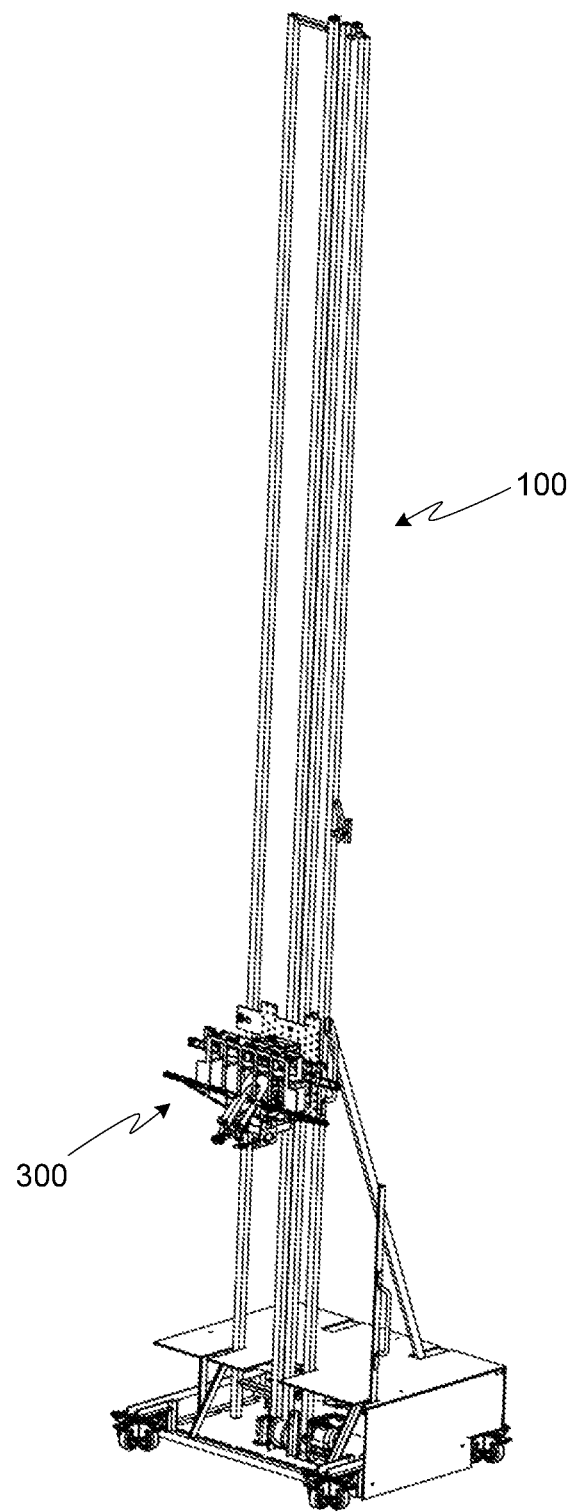
FIG. 21 provides a perspective view of the payload transportation system of the invention with a planter attachment.
Figure 22:
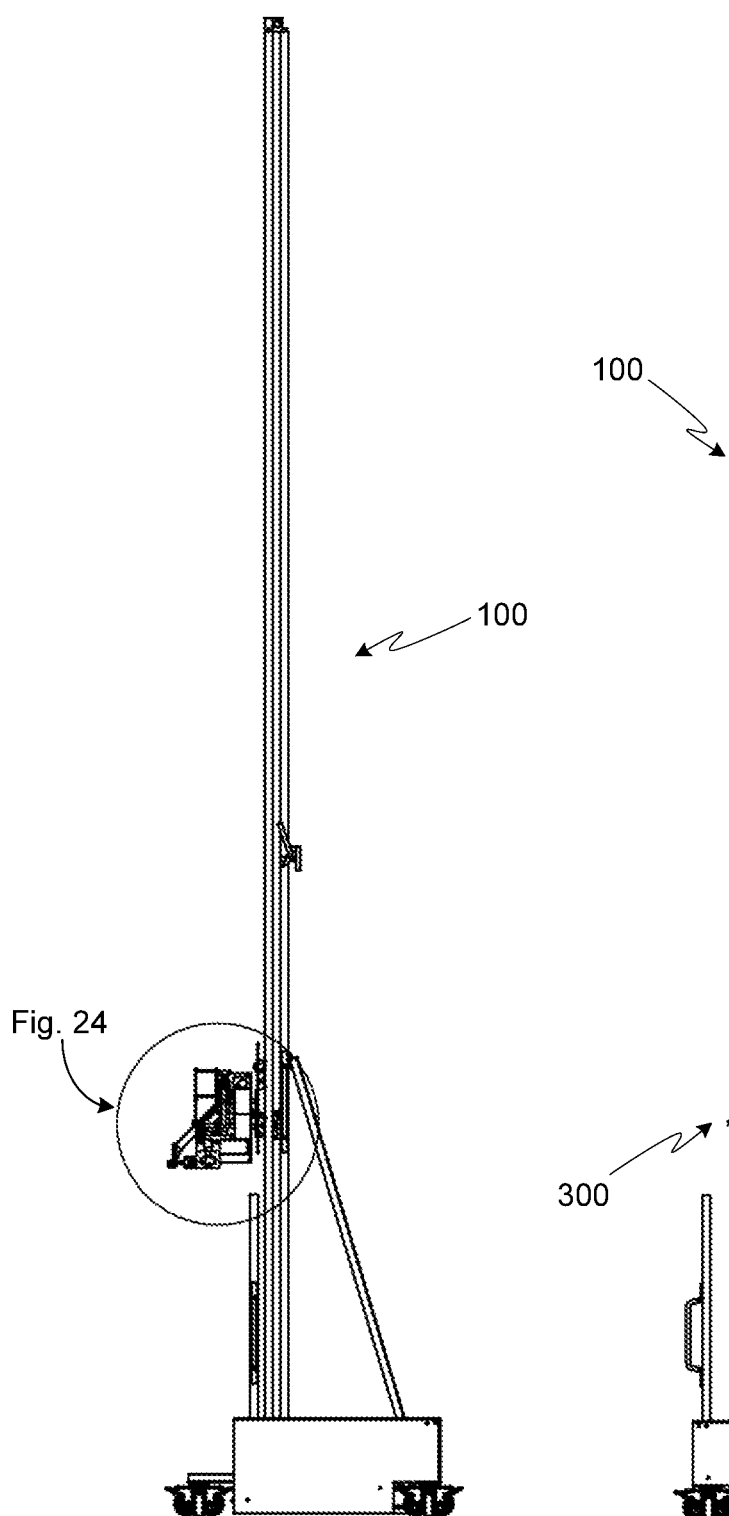
FIG. 22 provides a side view of the assembly shown in FIG. 21.
Figure 23:
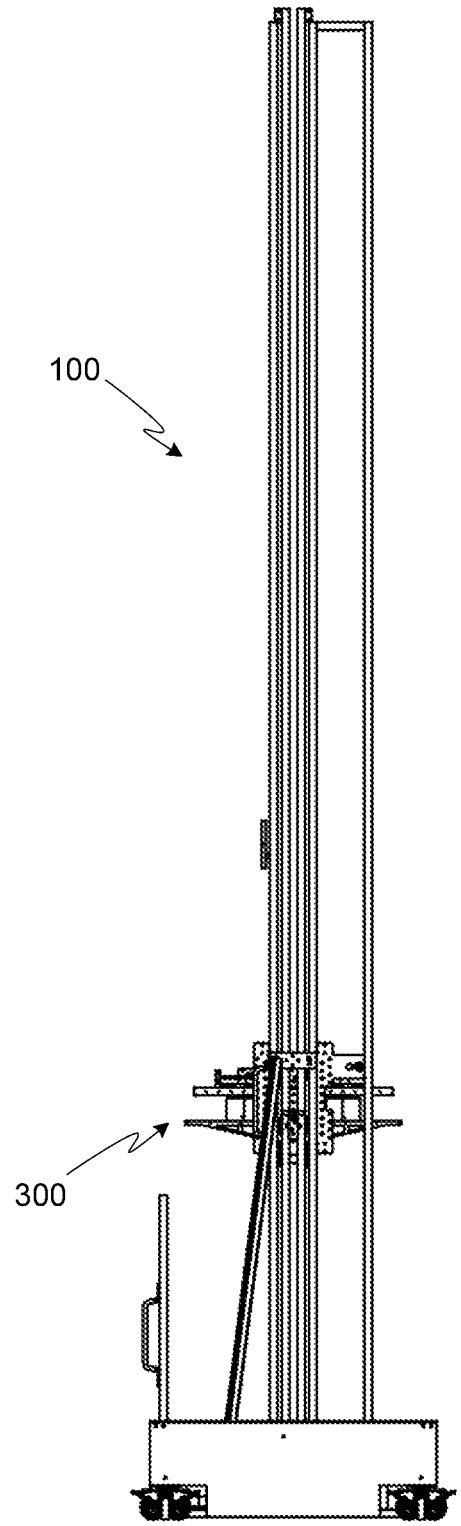
FIG. 23 provides a rear view of the assembly shown in FIGS. 21 and 22.
Figure 24:
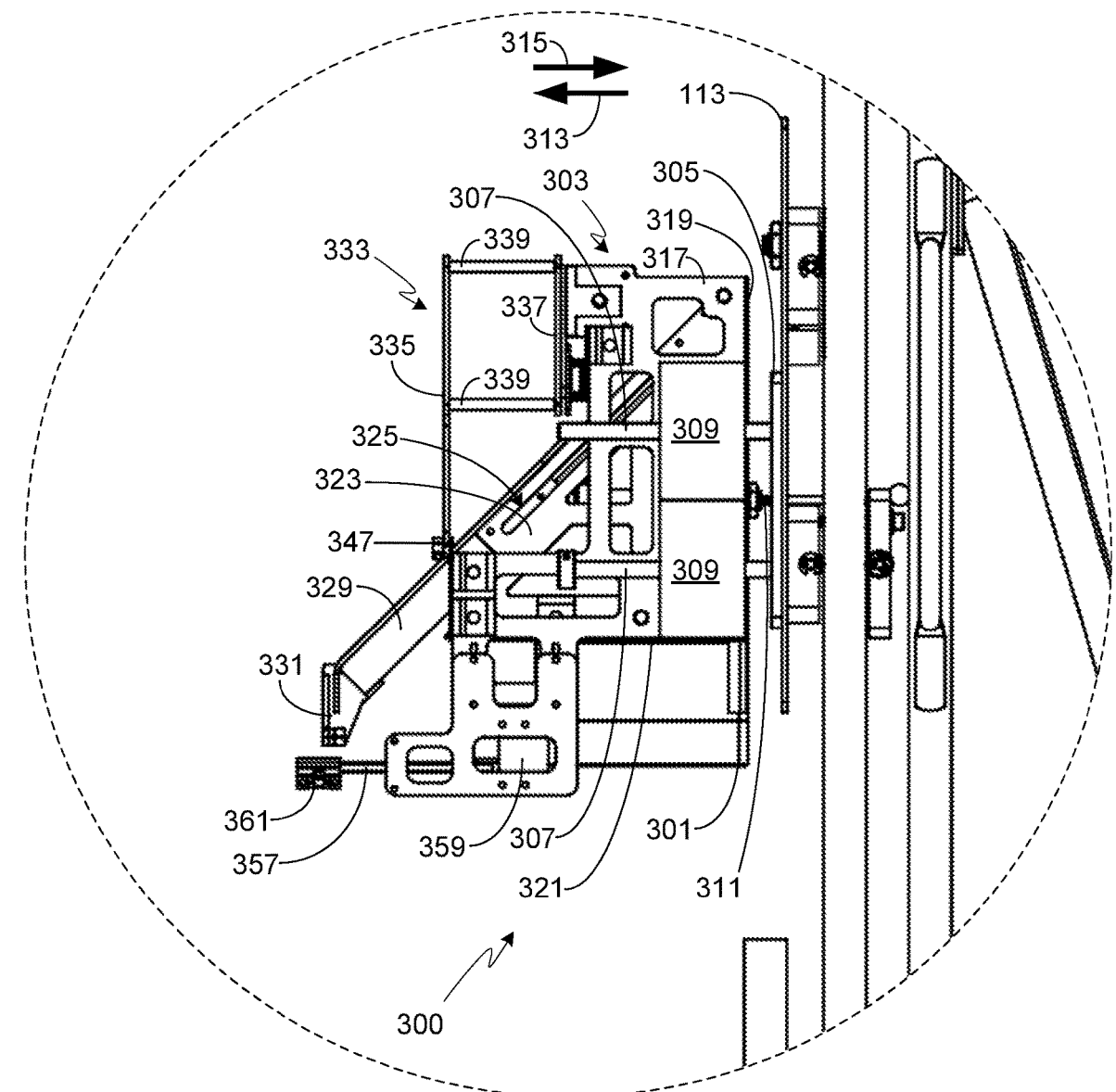
FIG. 24 provides a detailed side view of the planter attachment shown in FIGS. 21-23.
Figure 25:
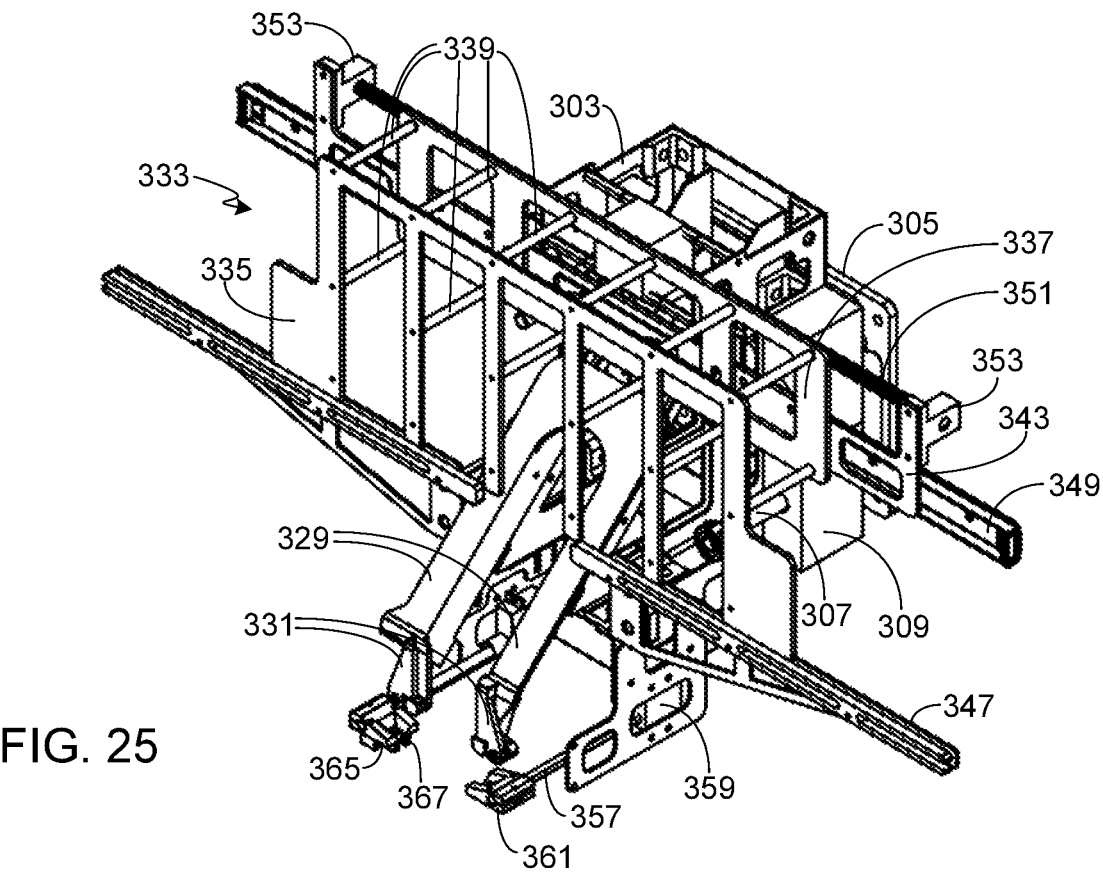
FIG. 25 provides a perspective view of the planter attachment shown in FIG. 24.
Figure 26:
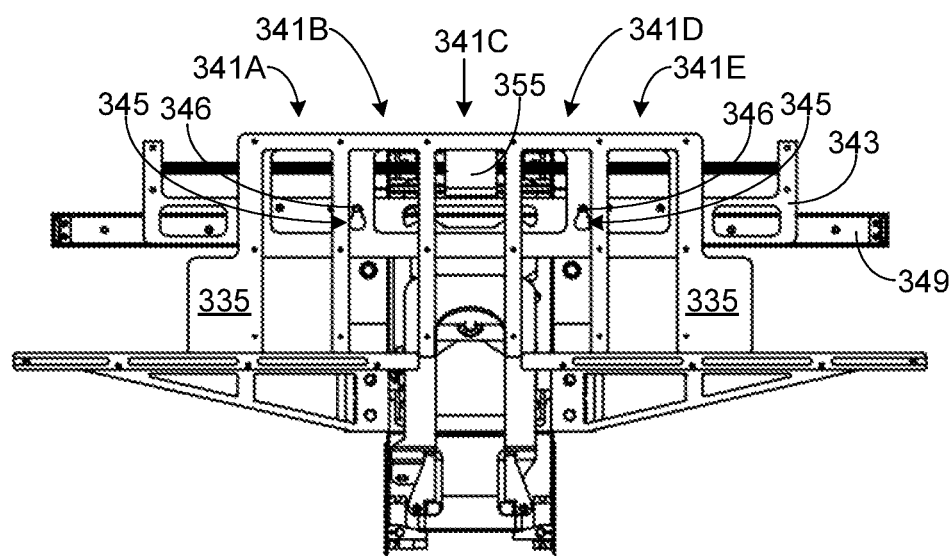
FIG. 26 provides a front view of the planter attachment shown in FIGS. 24-25.
Figure 27:
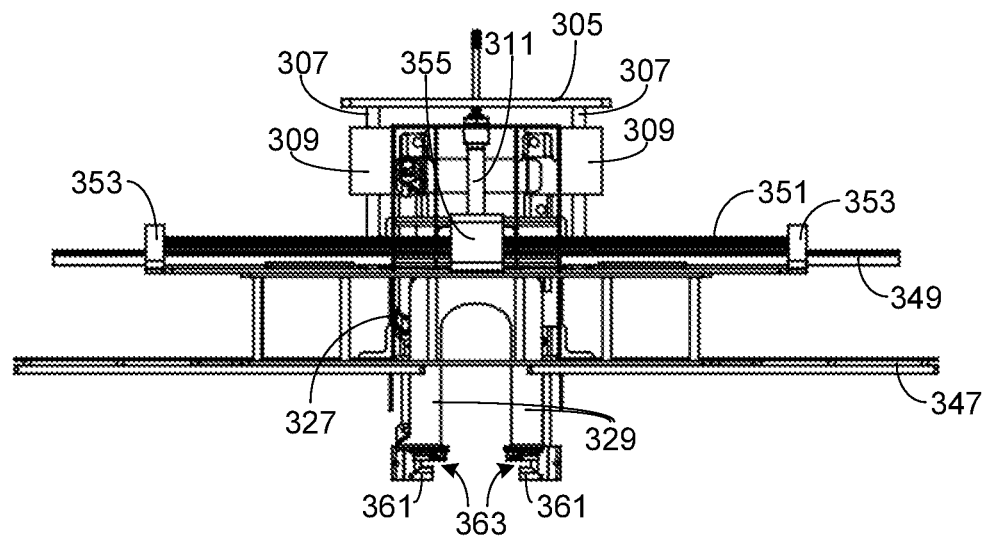
FIG. 27 provides a top view of the planter attachment shown in FIGS. 24-26.

FIGS. 21-23 provide perspective, side and back views, respectively, of a planter payload 300 attached to interface plate 113 of payload transportation system 100. FIGS. 24-27 provide side, perspective, front and top views, respectively, of planter 300.

As previously noted with respect to payload transport system 100, the system can be configured to operate autonomously, semi-automatically or manually. When operated autonomously or semi-automatically, preferably the planter 300 communicates with the transport system 100 in order to properly position the transport system and the planter relative to tower 101, locate the planter at different vertical positions on the tower, and operate the functionality associated with the planter and discussed further below. While the control system for such operation can be solely maintained within controller 108, preferably at least some, if not all, of the control for the planter is included in an on-board controller, which is mounted within a control box 301. In the preferred embodiment, the control box is mounted under the planter frame 303. The on-board controller includes a processor as well as sufficient memory (e.g., EPROM, EEPROM, flash memory, etc.) for storing instructions. The controller can be used to monitor sensors located on the planter, for example sensors that monitor the operational state of the planter, whether or not the planter is properly engaged with the tower, vertical location of the planter relative to the tower, current capacity of the planter's magazine, etc. Additionally, the on-board controller can monitor and operate the planter's magazine indexing system, the planter's pusher arm, etc. Although in the preferred embodiment the on-board controller directly controls the functionality of the planter and the transport system, it should be understood that the information acquired by the controller can be transmitted via the payload harness to controller 108, and controller 108 can direct operation of the planter and transport system.

Planter 300 includes a mounting plate 305, preferably fabricated from stainless steel, which is configured to be mounted to interface plate 113 of transport system 100. Plate 305 can be configured to be mounted to interface plate 113 using bolts, clips, hooks or other means. Integral to mounting plate 305 are four linear guide rails 307 that interface with frame-mounted, linear bearings 309. Bearings 309 are wash-down bearings, i.e., resistant to damage from repetitive washings. Additionally, bearings 309 are preferably fabricated from ultra-high molecular weight (UHMW) polyethylene.

One end of an air cylinder 311 is bolted to mounting plate 305. The second end of air cylinder 311 is bolted to planter frame 303. This allows air cylinder 311 to move planter frame 303 forward (i.e., in a direction 313) or backward (i.e., in a direction 315) relative to mounting plate 305, and therefore relative to interface plate 113 and the transport system tower. In the illustrated embodiment, the range of forward/backward movement planter frame 303 is 2 inches.

Planter frame 303, referenced above and illustrated in the figures, is preferably comprised of four 16-gauge stainless steel walls (i.e., side walls 317, rear wall 319, and bottom wall member 321). Frame 303 also includes a pair of 16-gauge stainless steel pusher arm rails 323. As noted above, one end of air cylinder 311, also referred to herein as the engagement air cylinder, is mounted to frame 303 via rear wall 319. The four UHMW wash-down bearings 309 are mounted to frame side walls 317, two per side wall, and ride on the linear shafts 307 of mounting plate 305. Each pusher rail 323 includes a long slot 325 in which the pusher arm bushings ride. A pusher arm air cylinder 327 is mounted to one of the pusher arm rails 323. Preferably pusher arm air cylinder 327 has a 4 inch stroke.

Figure 28:
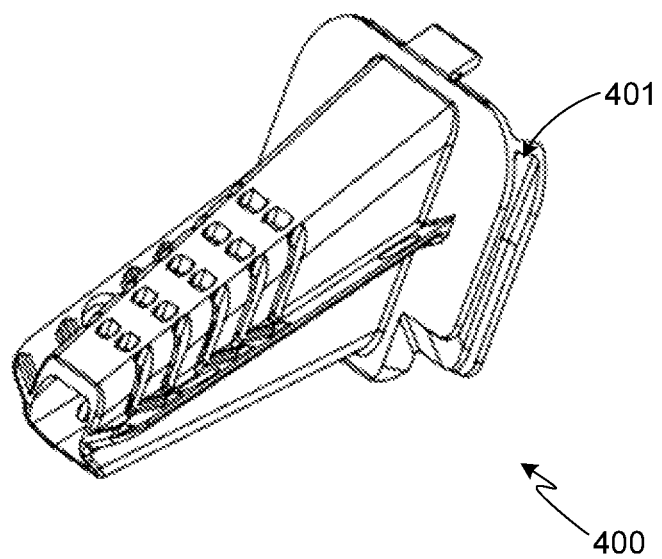
FIG. 28 provides a perspective view of a plant container suitable for use with the planter attachment shown in FIGS. 21-27.

A key element of the planter is pusher arm 329, which is actuated by pusher arm air cylinder 327. In the preferred embodiment, the end of arm 329 includes a pair of plant container spring-loaded gate members 331. The design of each member 331 is based on the configuration of the intended plant container. Thus, for example, using the plant container 400 shown in FIG. 28 and described fully in co-pending and co-assigned U.S. patent application Ser. No. 15/910,445, each gate member 331 includes an edge portion designed to slide within slot 401. It should be understood that the invention is not limited to a particular plant container and that plant container 400 is simply an example of a plant container suitable for use with planter 300.

In the preferred embodiment, pusher arm rails 323 and pusher arm 329 are set at an angle of 45 degrees. When pusher arm 329 is retracted by air cylinder 327, spring-loaded gate members 331 are locked open. At this point, a seedling container 400 (or other suitable plant container) slides from the magazine above and into position in pusher arm 329. The spring-loaded gate members 331 prevent the plant container from sliding down further than desired. As transport system 100 moves interface plate 113, and thus planter 300, in an upwards direction, the system is automatically monitoring for the next plant site as described in detail below. It should be understood, however, that identifying plant site locations can also be performed manually by a planter operator. Once the system senses a plant site (or the operator determines an appropriate plant site location), transport system 100 halts upward movement. Next, pusher arm 329 extends outward and downward at the preferred angle of 45 degrees as set by guide rails 323, thereby inserting the plant container into the opening within the hydroponic tower. When pusher arm 329 reaches full extension, transport system 100 re-initiates upwards movement. Since the plant container is locked into place within a cut-out in the tower, upwards movement of planter 300 causes the spring-loaded gate members 331 to open and release the plant container. When pusher arm 329 has moved fully past the plant container, it retracts and is loaded with a new plant container in readiness for the next plant site.

In accordance with the invention, prior to insertion the plant containers, along with the seedlings contained therein, are held within a magazine 333. In FIGS. 21-27, an empty magazine 333 (i.e., not containing any plant containers) is shown mounted to planter 300. In this embodiment, magazine 333 is comprised of a front plate 335 and a rear plate 337, the two plates coupled together using members 339. This particular magazine is divided into five regions 341A-341E, each region configured to hold a preset number of plant containers.

Figure 29:
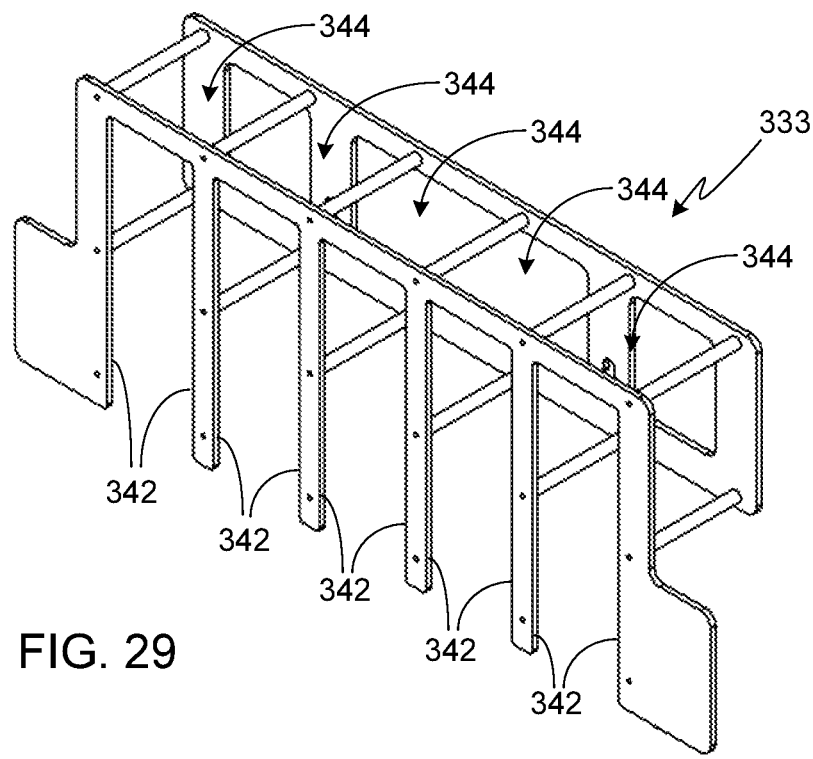
FIG. 29 provides a perspective view of the plant container magazine shown in FIGS. 21-27.
Figure 30:
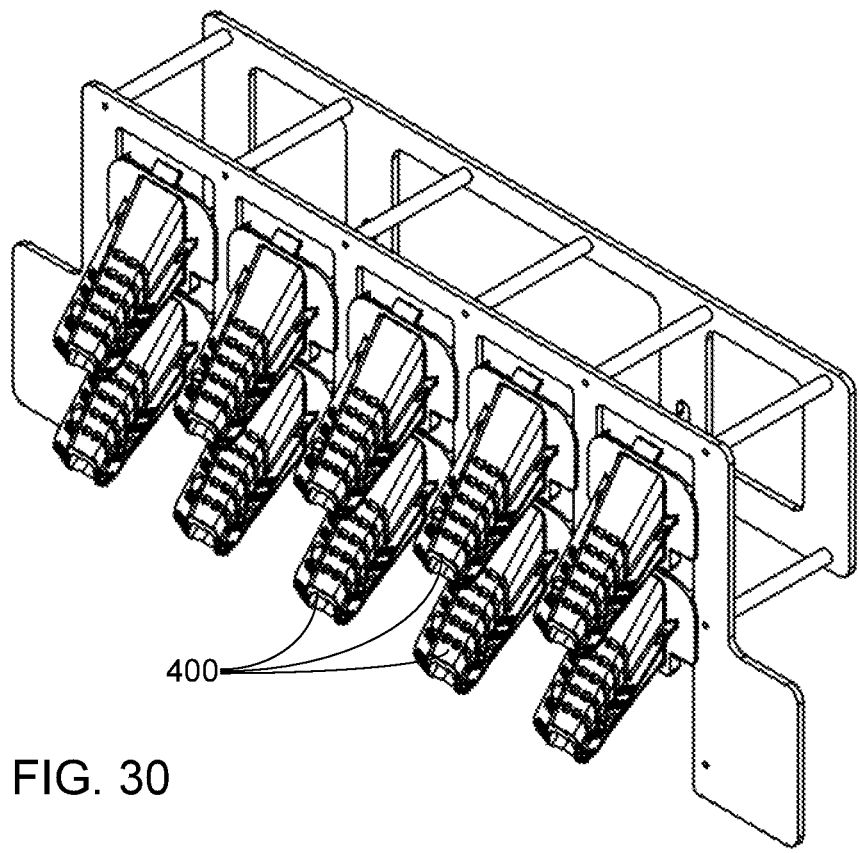
FIG. 30 provides a perspective view of the plant container magazine shown in FIG. 29 with the inclusion of two plant containers per magazine column.

FIG. 29 provides a detailed, perspective view of magazine 333 unmounted from planter 300. FIG. 30 provides the same view of magazine 333 with the inclusion of two plant containers 400 per magazine column. In this preferred embodiment, slots 401 of each plant container 400 slide over the edges 342 of each region/slot of the magazine. In order to ensure that the plant containers slide easily out of the magazine, preferably front magazine plate 335 is fabricated from a plastic material (e.g., acrylic) or other material with a relatively low coefficient of friction. In this embodiment, the other components of the magazine, i.e., rear plate 337 and connecting members 339, are fabricated from stainless steel. It will be appreciated that the design of the magazine insures that there is sufficient space between front plate 335 and rear plate 337, i.e., regions 344, to accommodate the young seedlings contained within the plant containers.

Figure 31:
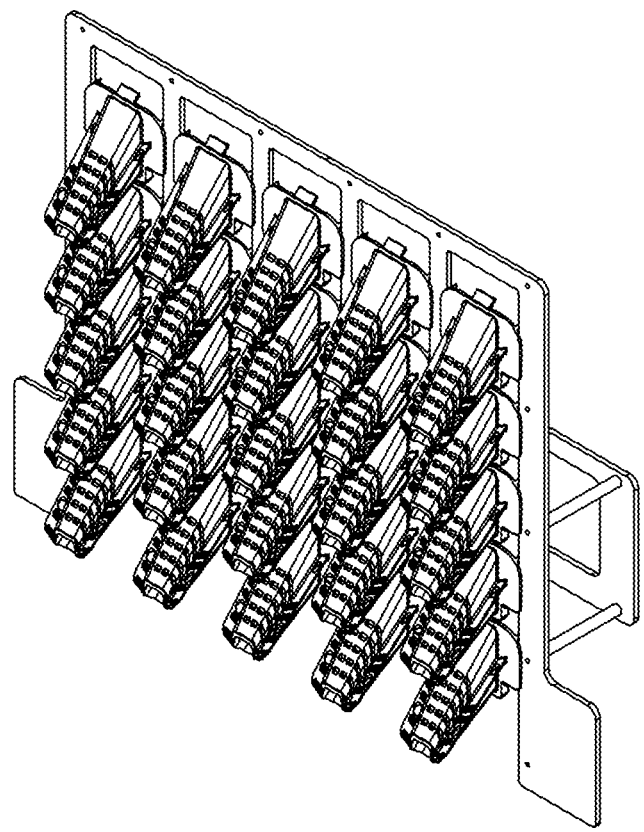
FIG. 31 provides a perspective view of an alternate plant container magazine configured to accommodate five plant containers per magazine column.
Figure 32:
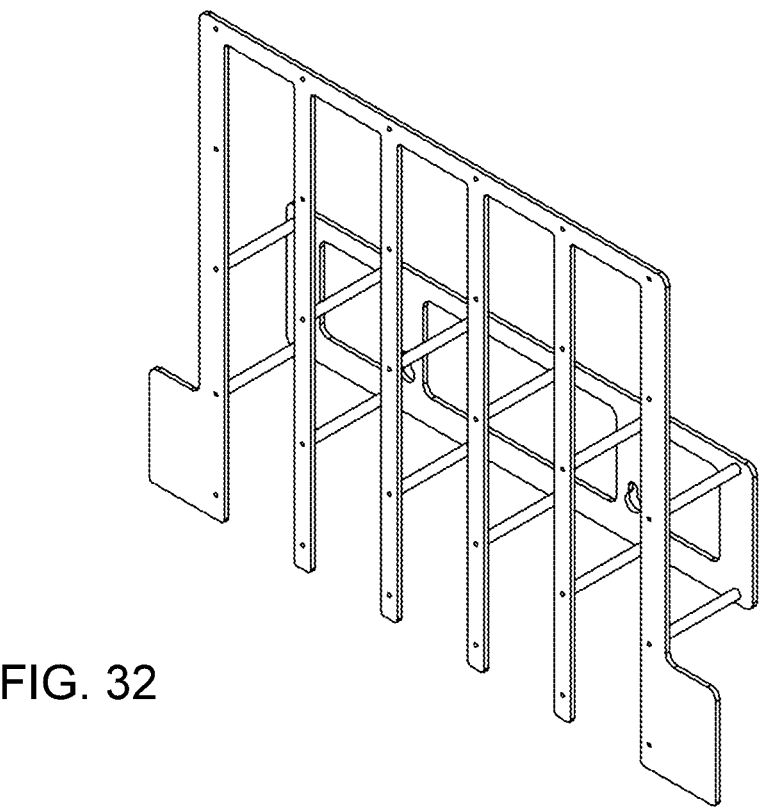
FIG. 32 provides a perspective view of the plant container magazine shown in FIG. 31 emptied of all plant containers.

While magazine 333 shown mounted to the planter is preferred, other size magazines can also be used with the same planter 300. For example, FIGS. 31 and 32 provide perspective views, with and without plant containers, of a magazine designed to accommodate 25 plant configurations. It should be understood that other magazine configurations may be used with the planter, the selected magazine configuration based on the size and configuration of the individual plant containers as well as the desired number of plant containers per magazine.

In the preferred embodiment, rear magazine wall 337 is configured to hook onto shoulder screws 346 of rear magazine guide rail 343 via keyhole fittings 345. The keyhole fittings allow an operator to quickly remove empty magazines and load full magazines onto planter 300. The lower edge of front magazine wall 335 rests on front guide rail 347. Guide rails 343 and 347 constrain forward/rearward movement of magazine 333 while permitting side to side movement.

Planter 300 includes a magazine indexing system that is used to move magazine 333 sideways so that when all of the plant containers (e.g., container 400) from one column of the magazine have been inserted into the hydroponic vertical tower, a new set of plant containers can be moved into place, readying the system for further container insertions. Rear guide rail 343 is attached to linear slide system 349, with member 349 being rigidly attached to the planter frame and guide rail 343 constrained to move side to side. A lead screw 351 is affixed to guide rail 343 by members 353. A stepper motor 355, which is configured to turn lead screw 351 in precise and controllable amounts, allows the controller to move guide rail 343 and attached magazine 333 by one column width when the present magazine column is empty.

Planter 300 requires means for maintaining the distance between the tower front face and the planter, thus ensuring that the insertion depth for each plant container is correct. It will be appreciated that the exact nature of this system depends upon the shape of the vertical tower. For example, in the preferred embodiment a pair of engagement arms 357 is attached to frame side walls 317 via servos 359. Servos 359 allow engagement arms 357 to rotate, preferably under the control of the on-board controller. At the end of each arm 357 is a forked member 361. When planter 300 and transport system 100 are disengaged from a tower, forked members 361 are rotated downward. When planter 300 and transport system 100 are engaged with a tower, forked members 361 are rotated upwards, capturing an edge or lip of the tower within the slotted region 363 of each forked member 361. A hydroponic tower with a suitable front face lip is disclosed in co-pending and co-assigned U.S. patent application Ser. No. 15/968,425, filed 1 May 2018, the disclosure of which is incorporated herein for any and all purposes.

It will be appreciated that there are various techniques that may be used to monitor the vertical location of the planter relative to the tower and determine where to place the plant container. Assuming the use of a hydroponic tower with tower face cut-outs configured to accept the plant containers, preferably the locating means are directly linked to the cut-outs, thus ensuring that the planter is properly located when inserting a plant container. Direct linkage to the cut-out typically requires an identification indicator to be placed in a specific location relative to each cut-out. The identification indicator may be mechanical (e.g., an indent), optical (e.g., a hole, reflector, or other mark suitable for use with an optical sensor), magnetic (e.g., a magnetic dot or other indicator), etc. In the preferred embodiment, adjacent to each cut-out is a hole, the hole being located on the lip that forked member 361 captures when the planter and transport system are engaged with a tower. One of the forked members 361 includes an IR transmitter 365 and an IR sensor 367 connected to the controller. As planter 300 moves up the tower, it monitors the output of sensor 367. When sensor 367 outputs a signal indicating a hole, the controller relays a "stop" command. In response, the lift stops upwards movement, allowing planter 300 to insert a plant container into the cut-out as described in detail above.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A plant harvesting system for use with a vertical hydroponic tower, the vertical hydroponic tower containing a plurality of vertically aligned plants, each of said plurality of vertically aligned plants comprising a plant stalk and a plurality of leafs, the plant harvesting system comprising:

a payload transport system configured to be positioned at a location adjacent to said vertical hydroponic tower, said payload transport system comprising:
  a base; and
  a lift tower mounted to said base, said lift tower further comprising a motorized payload lift system, said motorized payload lift system configured to move an interface plate in an upward direction and in a downward direction; and
a harvester mounted to said interface plate via a mounting plate, wherein said harvester harvests said plurality of leafs from each of said plurality of vertically aligned plants as said motorized payload lift system moves said harvester in said upward direction along a face of said vertical hydroponic tower; and
a pair of guides configured to maintain said harvester in a preset harvesting position relative to said vertical hydroponic tower as said motorized payload lift system moves said harvester in said upward direction along said face of said vertical hydroponic tower.

2. The plant harvesting system of claim 1, said pair of guides configured to capture a feature of said vertical hydroponic tower as said motorized payload lift system moves said harvester in said upward direction along said face of said vertical hydroponic tower.

3. A plant harvesting system for use with a vertical hydroponic tower, the vertical hydroponic tower containing a plurality of vertically aligned plants, each of said plurality of vertically aligned plants comprising a plant stalk and a plurality of leafs, the plant harvesting system comprising:
  a payload transport system configured to be positioned at a location adjacent to said vertical hydroponic tower, said payload transport system comprising:
    a base; and
    a lift tower mounted to said base, said lift tower further comprising a motorized payload lift system, said motorized payload lift system configured to move an interface plate in an upward direction and in a downward direction; and
  a harvester mounted to said interface plate via a mounting plate, wherein said harvester harvests said plurality of leafs from each of said plurality of vertically aligned plants as said motorized payload lift system moves said harvester in said upward direction along a face of said vertical hydroponic tower, said harvester further comprising:
    an assembly of guide rails rigidly coupled to said mounting plate, said harvester movably coupled to said assembly of guide rails; and
    an actuator coupled to said harvester and said mounting plate, said actuator configured to move said harvester on said assembly of guide rails in a forward direction towards said vertical hydroponic tower and in a rearward direction away from said vertical hydroponic tower.

4. The plant harvesting system of claim 3, said actuator selected from the group consisting of pneumatic actuators and electro-mechanical actuators.

5. The plant harvesting system of claim 3, wherein said harvester is extended in said forward direction to engage with said vertical hydroponic tower, and wherein said harvester is retracted in said rearward direction to disengage from said vertical hydroponic tower.

6. The plant harvesting system of claim 1, said harvester further comprising a plurality of guide surfaces configured to funnel said plurality of leafs from each of said plurality of vertically aligned plants away from said vertical hydroponic tower as said harvester moves in said upward direction along said face of said vertical hydroponic tower.

7. The plant harvesting system of claim 6, said plurality of guide surfaces configured to funnel said plurality of leafs from each of said plurality of vertically aligned plants towards a central collection zone of said harvester as said harvester moves in said upward direction along said face of said vertical hydroponic tower.

8. The plant harvesting system of claim 6, said harvester further comprising a guide slot located between a first guide surface and a second guide surface of said plurality of guide surfaces, said guide slot configured to accommodate said plant stalk from each of said plurality of vertically aligned plants as said harvester moves in said upward direction along said face of said vertical hydroponic tower.

9. A plant harvesting system for use with a vertical hydroponic tower, the vertical hydroponic tower containing a plurality of vertically aligned plants, each of said plurality of vertically aligned plants comprising a plant stalk and a plurality of leafs, the plant harvesting system comprising:
  a payload transport system configured to be positioned at a location adjacent to said vertical hydroponic tower, said payload transport system comprising:
    a base; and
    a lift tower mounted to said base, said lift tower further comprising a motorized payload lift system, said motorized payload lift system configured to move an interface plate in an upward direction and in a downward direction; and
  a harvester mounted to said interface plate via a mounting plate, wherein said harvester harvests said plurality of leafs from each of said plurality of vertically aligned plants as said motorized payload lift system moves said harvester in said upward direction along a face of said vertical hydroponic tower, said harvester further comprising at least one plant stalk cutting blade, said at least one plant stalk cutting blade positioned in front of a leaf collection region of said harvester, said at least one plant stalk cutting blade configured to sever said plant stalk of each of said plurality of vertically aligned plants as said harvester moves in said upward direction along said face of said vertical hydroponic tower.

10. The plant harvesting system of claim 9, said at least one plant stalk cutting blade selected from the group consisting of stationary cutting blades, oscillating cutting blades, scissor cutting blades, and spinning cutting blades.

11. The plant harvesting system of claim 9, said at least one plant stalk cutting blade selected from the group consisting of serrated cutting blades and smooth cutting blades.

12. The plant harvesting system of claim 9, said harvester configured to collect said plurality of leafs from each of said plurality of vertically aligned plants after said at least one cutting blade severs said plant stalk of each of said plurality of vertically aligned plants as said harvester moves in said upward direction along said face of said vertical hydroponic tower.

13. The plant harvesting system of claim 12, said harvester directing said plurality of leafs from each of said plurality of vertically aligned plants towards a collection bin after said at least one cutting blade severs said plant stalk of each of said plurality of vertically aligned plants.

14. A plant harvesting system for use with a vertical hydroponic tower, the vertical hydroponic tower containing a plurality of vertically aligned plants, each of said plurality of vertically aligned plants comprising a plant stalk and a plurality of leafs, said plurality of vertically aligned plants contained within a plurality of plant containers, the plant harvesting system comprising:

a payload transport system configured to be positioned at a location adjacent to said vertical hydroponic tower, said payload transport system comprising:

a base; and a lift tower mounted to said base, said lift tower further comprising a motorized payload lift system, said motorized payload lift system configured to move an interface plate in an upward direction and in a downward direction; and a harvester mounted to said interface plate via a mounting plate, wherein said harvester harvests said plurality of leafs from each of said plurality of vertically aligned plants as said motorized payload lift system moves said harvester in said upward direction along a face of said vertical hydroponic tower, said harvester further comprising a pair of plant container removal wedges mounted to a front face of said harvester, said pair of plant container removal wedges configured to dislodge each of said plurality of plant containers from said vertical hydroponic tower as said harvester moves in said upward direction along said face of said vertical hydroponic tower.

15. The plant harvesting system of claim 1, said motorized payload lift system of said payload transport system further comprising a drive motor, said drive motor coupled to said interface plate via a chain or a cable.

16. The plant harvesting system of claim 1, said base of said payload transport system further comprising a plurality of wheel assemblies, said plurality of wheel assemblies configured to allow said plant harvesting system to move between a plurality of vertical hydroponic towers.

17. The plant harvesting system of claim 16, said plurality of wheel assemblies selected from the group consisting of caster wheels, omnidirectional wheels and mecanum wheels.

18. The plant harvesting system of claim 1, said payload transport system further comprising at least one travel limiting switch, said at least one travel limiting switch configured to interrupt operation of said motorized payload lift system when said at least one travel limiting switch is triggered.

19. The plant harvesting system of claim 1, said lift tower of said payload transport system further comprising a one-way stop, said one-way stop allowing free movement of said interface plate in said upward direction, and said one-way stop preventing free movement of said interface plate in said downward direction unless said one-way stop is released.

* * * * *